(12) United States Patent
Tachibana et al.

(10) Patent No.: US 11,152,879 B2
(45) Date of Patent: Oct. 19, 2021

(54) MOTOR CONTROL DEVICE, METHOD OF ESTIMATING INITIAL POSITION OF MAGNETIC POLE OF ROTOR, AND IMAGE FORMING APPARATUS

(71) Applicant: KONICA MINOLTA, INC., Tokyo (JP)

(72) Inventors: Yuta Tachibana, Toyokawa (JP); Hiroyuki Yoshikawa, Toyohashi (JP); Daichi Suzuki, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 64 days.

(21) Appl. No.: 16/785,959

(22) Filed: Feb. 10, 2020

(65) Prior Publication Data

US 2020/0266745 A1    Aug. 20, 2020

(30) Foreign Application Priority Data

Feb. 18, 2019 (JP) .............................. JP2019-026230

(51) Int. Cl.
| | |
|---|---|
| *H02P 21/00* | (2016.01) |
| *H02P 21/18* | (2016.01) |
| *H02P 21/22* | (2016.01) |
| *G03G 15/00* | (2006.01) |
| *H02P 27/12* | (2006.01) |

(52) U.S. Cl.
CPC ......... *H02P 21/18* (2016.02); *G03G 15/6529* (2013.01); *H02P 21/22* (2016.02); *H02P 27/12* (2013.01); *H02P 2203/03* (2013.01)

(58) Field of Classification Search
CPC .......... H02P 21/18; H02P 27/12; H02P 21/22; H02P 6/28; H02P 2701/03; H02P 27/06; H02P 2203/03; G03G 15/6529
See application file for complete search history.

(56) References Cited

U.S. PATENT DOCUMENTS 4,876,491 A    10/1989  Squires et al.
2020/0161995 A1*    5/2020  Nishimori ................. H02P 6/30

FOREIGN PATENT DOCUMENTS

JP    2547778 B2    7/1987

* cited by examiner

*Primary Examiner* — Karen Masih
(74) *Attorney, Agent, or Firm* — Buchanan Ingersoll & Rooney PC

(57) ABSTRACT

In a motor control device, when estimating an initial position of a magnetic pole of a rotor of a motor, a drive circuit continuously or intermittently applies a voltage to a stator winding at each of a plurality of energization angles while sequentially changing the energization angles, and at a voltage value and for an energization time period, the voltage value and the energization time period being set such that the rotor does not rotate. An initial position estimation unit calculates an estimated initial position of the magnetic pole of the rotor based on a phase angle of a trigonometric function curve that approximates a change of a γ-axis current Iγ with respect to each of the energization angles. The trigonometric function curve has a cycle equal to one electrical cycle of the motor.

19 Claims, 24 Drawing Sheets

FIG.12
cos, sin TABLE

| i | $\theta_M[i]$ | $\cos(\theta_M[i])$ | $\sin(\theta_M[i])$ |
|---|---|---|---|
| 1 | 0 | 1.0000 | 0.0000 |
| 2 | 30 | 0.8660 | 0.5000 |
| 3 | 60 | 0.5000 | 0.8660 |
| 4 | 90 | 0.0000 | 1.0000 |
| 5 | 120 | −0.5000 | 0.8660 |
| 6 | 150 | −0.8660 | 0.5000 |
| 7 | 180 | −1.0000 | 0.0000 |
| 8 | 210 | −0.8660 | −0.5000 |
| 9 | 240 | −0.5000 | −0.8660 |
| 10 | 270 | 0.0000 | −1.0000 |
| 11 | 300 | 0.5000 | −0.8660 |
| 12 | 330 | 0.8660 | −0.5000 |

FIG.15

| i | $\theta_M[i]$ | A1[i] | A2[i] |
|---|---|---|---|
| 1 | 0 | 1.0000 | 0.0000 |
| 2 | 180 | −1.0000 | 0.0000 |
| 3 | 30 | 0.8660 | 0.5000 |
| 4 | 210 | −0.8660 | −0.5000 |
| 5 | 60 | 0.5000 | 0.8660 |
| 6 | 240 | −0.5000 | −0.8660 |
| 7 | 90 | 0.0000 | 1.0000 |
| 8 | 270 | 0.0000 | −1.0000 |
| 9 | 120 | −0.5000 | 0.8660 |
| 10 | 300 | 0.5000 | −0.8660 |
| 11 | 150 | −0.8660 | 0.5000 |
| 12 | 330 | 0.8660 | −0.5000 |

| MAGNETIC POLE POSITION: θ [DEGREE] | ESTIMATE VALUE $\phi_1$ [DEGREE] | ERROR [DEGREE] |
|---|---|---|
| 0 | -4.35 | -4.35 |
| 30 | 22.50 | -7.50 |
| 60 | 54.37 | -5.63 |
| 90 | 83.28 | -6.72 |
| 120 | 119.18 | -0.82 |
| 150 | 154.95 | 4.95 |
| 180 | 190.77 | 10.77 |
| 210 | 219.37 | 9.37 |
| 240 | 251.67 | 11.67 |
| 270 | 273.70 | 3.70 |
| 300 | 304.99 | 4.99 |
| 330 | 332.56 | 2.56 |

MOTOR CONTROL DEVICE, METHOD OF ESTIMATING INITIAL POSITION OF MAGNETIC POLE OF ROTOR, AND IMAGE FORMING APPARATUS

The entire disclosure of Japanese Patent Application No. 2019-026230, filed on Feb. 18, 2019, is incorporated herein by reference in its entirety.

BACKGROUND

Technological Field

The present disclosure relates to a motor control device, a method of estimating an initial position of a magnetic pole of a rotor, and an image forming apparatus, and is used for controlling an alternating-current (AC) motor such as a sensorless-type brushless direct-current (DC) motor (also referred to as a permanent magnet synchronous motor).

Description of the Related Art

A sensorless-type brushless DC motor does not include a sensor for detecting a magnetic pole position of a permanent magnet of a rotor with respect to each phase coil of a stator. Thus, in general, before starting the motor, a stator is energized at a prescribed electrical angle so as to pull the magnetic pole of the rotor to a position in accordance with the energized electrical angle (hereinafter also referred to as an energization angle), and subsequently start the rotation of the motor.

When the rotor is to be pulled, however, the rotor is pulled while being displaced by up to ±180°. Thus, the rotor may vibrate greatly. In such a case, it is necessary to wait until the vibrations are reduced to the level at which the motor can be started.

Furthermore, in the application that does not allow the rotor to move before starting the motor, a method of pulling the rotor cannot be employed. For example, when a brushless DC motor is adopted as a motor for paper feeding for conveyance of paper in an electrophotographic-type image forming apparatus, a method of pulling a rotor cannot be employed for estimating the initial position of the magnetic pole, which is due to the following reason. Specifically, when the rotor is moved before starting the motor, a sheet of paper is fed accordingly, which leads to jamming.

Thus, an inductive sensing method (for example, see Japanese Patent No. 2547778) is known as a method of estimating a magnetic pole position of a rotor in the rest state without pulling the rotor. The method of estimating an initial position utilizes the property of an effective inductance that slightly changes in accordance with the positional relation between the magnetic pole position of the rotor and the current magnetic field by the stator winding when the stator winding is applied with a voltage at a level not causing rotation of the rotor at a plurality of electrical angles. Specifically, according to Japanese Patent No. 2547778, the position of the magnetic pole of the rotor is indicated by the energization angle showing the highest current value at the time when the stator winding is applied with a voltage at each electrical angle for a prescribed energization time period.

SUMMARY

The method of estimating the initial position by inductive sensing utilizes a magnetic saturation phenomenon, for example. When a stator current is caused to flow in a d-axis direction corresponding to the direction of the magnetic pole of the rotor, a magnetic flux by a permanent magnet of the rotor and a magnetic flux by the current are added. Thereby, a magnetic saturation occurs to reduce the inductance. Such reduction of the inductance can be detected by a change of the stator current. Furthermore, in the case of an interior permanent magnet (IPM) motor, saliency occurs by which the inductance in the q-axis direction becomes larger than the inductance in the d-axis direction. Thus, in this case, an effective inductance decreases in the case of a d-axis current even if no magnetic saturation occurs.

One of the problems of the above-mentioned initial position estimation method is a significant dependence on the structure and the characteristics of the motor, which is due to the following reasons. Specifically, depending on the structure of the motor, the effective inductance only slightly changes, with the result that: the stator current scarcely changes in accordance with the energization angle; or the energization angle at which the peak value of the stator current is detected does not indicate the magnetic pole position of the rotor (which will be specifically described in embodiments).

Specifically, when a magnetic saturation phenomenon is utilized, the voltage to be applied and the voltage application time period need to be set to the levels at which magnetic saturation occurs when at least a d-axis current flows. This is because, on the levels at which magnetic saturation scarcely occurs, the energization angle at which the highest current value is achieved may be displaced from the magnetic pole position, and a sufficient signal-to-noise (SN) ratio may not be obtained. However, the motor efficiency has been recently improved to thereby increase motors that are less likely to cause magnetic saturation, so that accurate initial position estimation has been becoming difficult.

On the other hand, if the voltage to be applied and the voltage application time period are excessively increased for significantly reducing the inductance, there occurs a problem that the rotor moves. As a result, detection errors may occur or start-up may fail.

Particularly an inner rotor-type motor causes a problem in the above-described point (but the present disclosure is not limited to an inner rotor-type motor). Since the inner rotor-type motor has small inertia, which is advantageous in the case where the motor is repeatedly started and stopped at frequent intervals. However, when the inertia is small as in the inner rotor-type motor in the case where the initial position is estimated in an inductive sensing scheme, there occurs a problem that a rotor is moved readily by the current flowing through the stator winding during the initial position estimation.

The present disclosure has been made in consideration of the above-described problems occurring in an inductive sensing scheme. An object of the present disclosure is to allow accurate estimation of the initial position of the magnetic pole of the rotor even at a relatively small applied voltage and even in a relatively short voltage application time period when the initial position of the magnetic pole is estimated by an inductive sensing scheme in a sensorless-type motor driven with voltages in a plurality of phases. Other objects and features of the present disclosure will be clearly described in the embodiments.

To achieve at least one of the above-mentioned objects, according to an aspect of the present invention, a motor control device that controls a motor of a sensorless type reflecting one aspect of the present invention comprises: a drive circuit that applies a voltage to each of a plurality of phases of a stator winding of the motor, and a controller that controls the drive circuit. When the controller estimates an initial magnetic pole position of a rotor of the motor in an inductive sensing scheme, the controller: (i) causes the drive circuit to continuously or intermittently apply a voltage to the stator winding at each of a plurality of energization angles while sequentially changing the energization angles, and at a voltage value and for an energization time period, the voltage value and the energization time period being set such that the rotor does not rotate; (ii) converts peak values of currents flowing through the phases of the stator winding into a first current component having an electrical angle that is equal to a corresponding one of the energization angles and a second current component that is different in electrical angle by 90 degrees from the first current component, each of the peak values being obtained at a corresponding one of the energization angles; and (iii) estimates the initial magnetic pole position of the rotor based on a phase angle of a trigonometric function curve, the phase angle being obtained when a variation of the first current component with respect to each of the energization angles is approximated by the trigonometric function curve. The trigonometric function curve has a cycle equal to one electrical cycle of the motor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 12 is a diagram showing an example of a trigonometric function table used in the initial position estimation unit.

FIG. 15 is a diagram showing an example of a table storing energization angles and cosine values and sine values that correspond to their respective energization angles.

FIG. 24 is a flowchart for illustrating the timing of creating calibration data after a power supply of the image forming apparatus is turned on.

DETAILED DESCRIPTION OF EMBODIMENTS

Figure 1:
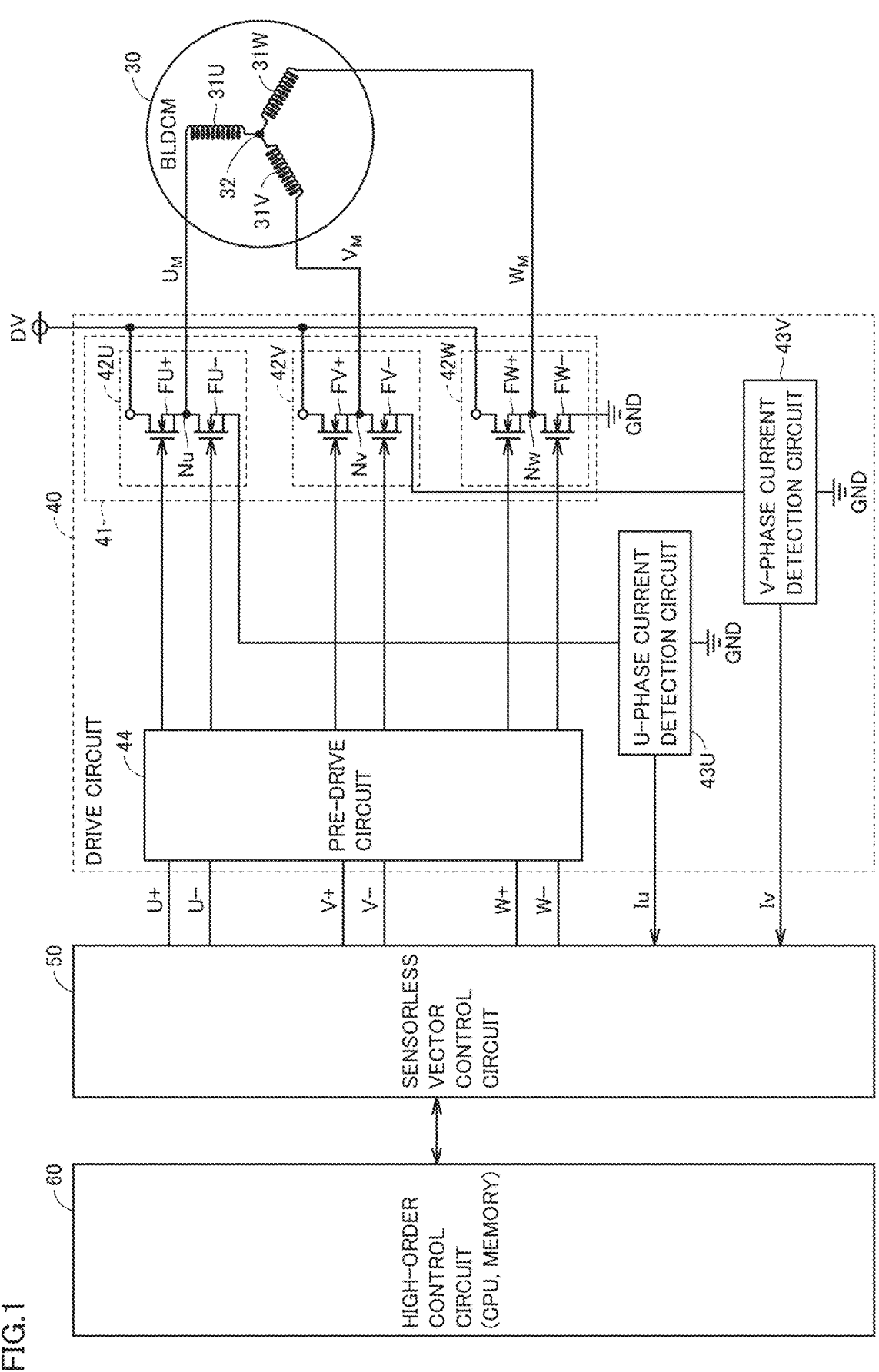
FIG. 1 is a block diagram showing the entire configuration of a motor control device.

Hereinafter, one or more embodiments of the present invention will be described with reference to the drawings. However, the scope of the invention is not limited to the disclosed embodiments.

While a brushless DC motor will be hereinafter described by way of example, the present disclosure is applicable to a sensorless-type AC motor driven by voltages in a plurality of phases (a brushless DC motor is also a type of an AC motor). The same or corresponding components will be denoted by the same reference characters, and description thereof will not be repeated.

First Embodiment

[Entire Configuration of Motor Control Device]

FIG. 1 is a block diagram showing the entire configuration of a motor control device. The motor control device controls driving of a sensorless-type three-phase brushless DC motor (BLDCM) 30. As shown in FIG. 1, the motor control device includes a drive circuit 40, a sensorless vector control circuit 50, and a high-order control circuit 60. Due to a sensorless-type, a Hall element or an encoder for detecting the rotation position of a rotor is not provided.

Drive circuit 40 is an inverter circuit in a pulse width modulation (PWM) control system. Drive circuit 40 converts a direct-current (DC) drive voltage DV into a three-phase AC voltage, and outputs the converted three-phase AC voltage. Specifically, based on inverter drive signals U+, U−, V+, V−, W+, and W− as PWM signals received from sensorless vector control circuit 50, drive circuit 40 supplies a U-phase voltage $U_M$, a V-phase voltage $V_M$, and a W-phase voltage $W_M$ to brushless DC motor 30. Drive circuit 40 includes an inverter circuit 41, a U-phase current detection circuit 43U, a V-phase current detection circuit 43V, and a pre-drive circuit 44.

Inverter circuit 41 includes a U-phase arm circuit 42U, a V-phase arm circuit 42V, and a W-phase arm circuit 42W. These arm circuits 42U, 42V, and 42W are connected in parallel with one another between the node receiving a DC drive voltage DV and the node receiving a ground voltage GND. For simplifying the following description, the node receiving DC drive voltage DV may be referred to as a drive voltage node DV while the node receiving ground voltage GND may be referred to as a ground node GND.

U-phase arm circuit 42U includes a U-phase transistor FU+ on the high potential side and a U-phase transistor FU− on the low potential side that are connected in series to each other. A connection node Nu between U-phase transistors FU+ and FU− is connected to one end of a U-phase winding 31U of brushless DC motor 30. The other end of U-phase winding 31U is connected to a neutral point 32.

As shown in FIG. 1, a U-phase winding 31U, a V-phase winding 31V, and a W-phase winding 31W of brushless DC motor 30 are coupled in a star connection. In the present specification. U-phase winding 31U, V-phase winding 31V, and W-phase winding 31W will be collectively referred to as a stator winding 31.

Similarly, V-phase arm circuit 42V includes a V-phase transistor FV+ on the high potential side and a V-phase transistor FV− on the low potential side that are connected in series to each other. A connection node Nv between V-phase transistors FV+ and FV− is connected to one end of V-phase winding 31V of brushless DC motor 30. The other end of V-phase winding 31V is connected to neutral point 32.

Similarly, W-phase arm circuit 42W includes a W-phase transistor FW+ on the high potential side and a W-phase transistor FW− on the low potential side that are connected in series to each other. A connection node Nw between W-phase transistors FW+ and FW− is connected to one end of W-phase winding 31W of brushless DC motor 30. The other end of W-phase winding 31W is connected to neutral point 32.

U-phase current detection circuit 43U and V-phase current detection circuit 43V serve as circuits for detecting a motor current with a two-shunt method. Specifically, U-phase current detection circuit 43U is connected between U-phase transistor FU− on the low potential side and ground node GND. V-phase current detection circuit 43V is connected between V-phase transistor FV− on the low potential side and ground node GND.

U-phase current detection circuit 43U and V-phase current detection circuit 43V each include a shunt resistance. The resistance value of the shunt resistance is as small as the order of $\frac{1}{10}$ Ω. Thus, the signal showing a U-phase current Iu detected by U-phase current detection circuit 43U and the signal showing a V-phase current Iv detected by V-phase current detection circuit 43V are amplified by an amplifier (not shown). Then, the signal showing U-phase current Iu and the signal showing V-phase current Iv are analog-to-digital (AD)-converted by an AD converter (not shown) and thereafter fed into sensorless vector control circuit 50.

A W-phase current Iw does not need to be detected since it can be calculated according to Kirchhoff's current rule based on U-phase current Iu and V-phase current Iv, that is, in accordance with Iw=−Iu−Iv. More generally, among U-phase current Iu, V-phase current Iv, and W-phase current Iw, currents of two phases only have to be detected, and the current value of one remaining phase can be calculated from the values of the detected currents of these two phases.

Pre-drive circuit 44 amplifies inverter drive signals U+, U−, V+, V−, W+, and W− that are PWM signals received from sensorless vector control circuit 50 so as to be output to the gates of transistors FU+, FU−, FV+, FV−, FW+, and FW−, respectively.

The types of transistors FU+, FU−, FV+, FV−, FW+, and FW− are not particularly limited, and, for example, may be a metal oxide semiconductor field effect transistor (MOSFET), may be a bipolar transistor, or may be an insulated gate bipolar transistor (IGBT).

Sensorless vector control circuit 50, which serves as a circuit for vector-controlling brushless DC motor 30, generates inverter drive signals U+, U−, V+, V−, W+, and W−, and supplies the generated signals to drive circuit 40. Furthermore, when brushless DC motor 30 is started, sensorless vector control circuit 50 estimates the initial position of the magnetic pole of the rotor in the rest state by an inductive sensing scheme.

Sensorless vector control circuit 50 may be configured as a dedicated circuit such as an application specific integrated circuit (ASIC), or may be configured to implement its function utilizing a field programmable gate array (FPGA) and/or a microcomputer.

High-order control circuit 60 is configured based on a computer including a central processing unit (CPU), memory, and the like. High-order control circuit 60 outputs a start command, a stop command, a rotation angle speed command value, and the like to sensorless vector control circuit 50.

Unlike the above-described configuration, sensorless vector control circuit 50 and high-order control circuit 60 may be configured as one control circuit by an ASIC, an FPGA or the like. In the present disclosure, the entities that control drive circuit 40 will be collectively referred to as a controller. The controller may be regarded as corresponding to sensorless vector control circuit 50, or may be regarded as an entire body obtained by combining sensorless vector control circuit 50 and high-order control circuit 60. Furthermore, the controller may be configured by a dedicated circuit such as an ASIC, or may be configured by an FPGA or a microcomputer, or may be configured by a combination of some of the components mentioned above.

[Overview of Motor Operation]

Figure 2:
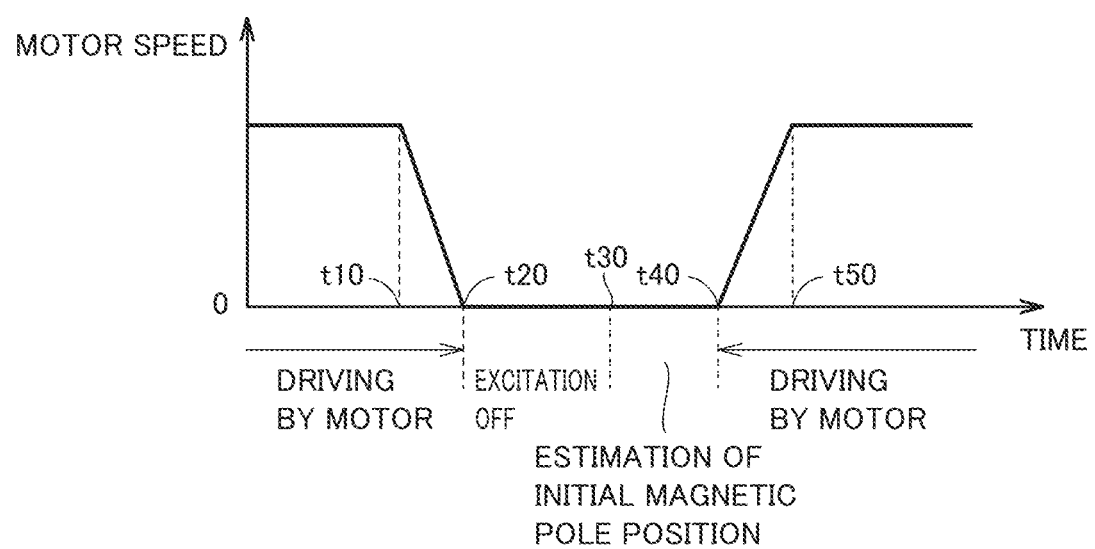
FIG. 2 is a timing chart showing a motor rotation speed in a time period from when a motor in a steady operation is stopped to when the motor is restarted.

FIG. 2 is a timing chart showing a motor rotation speed in a time period from when a motor in a steady operation is stopped to when the motor is restarted. The horizontal axis shows time while the vertical axis shows the rotation speed of the motor.

Referring to FIG. 2, the motor is decelerated in a time period from a time point t10 to a time point t20. Then, at time point t20, rotation of the motor is stopped. Supply of an exciting current to a stator is stopped in a time period from time point t20 to a time point t30.

Before the motor is restarted from a time point t40, the initial position of the magnetic pole of the rotor is estimated in a time period from time point t30 to time point t40. In order to apply a torque in the rotation direction to the rotor, a three-phase AC current needs to be supplied to stator winding 31 at an appropriate electrical angle in accordance with the initial position of the magnetic pole of the rotor. Thereby, the initial position of the magnetic pole of the rotor is estimated. In the present disclosure, an inductive sensing scheme is used as a method of estimating an initial position of a magnetic pole of a rotor.

When rotation of the rotor is started at time point t40, the brushless DC motor is subsequently controlled by a sensorless vector control scheme. The steady operation at a fixed rotation speed is started from a time point t50.

[Coordinate Axes in Sensorless Vector Control Scheme]

Figure 3:
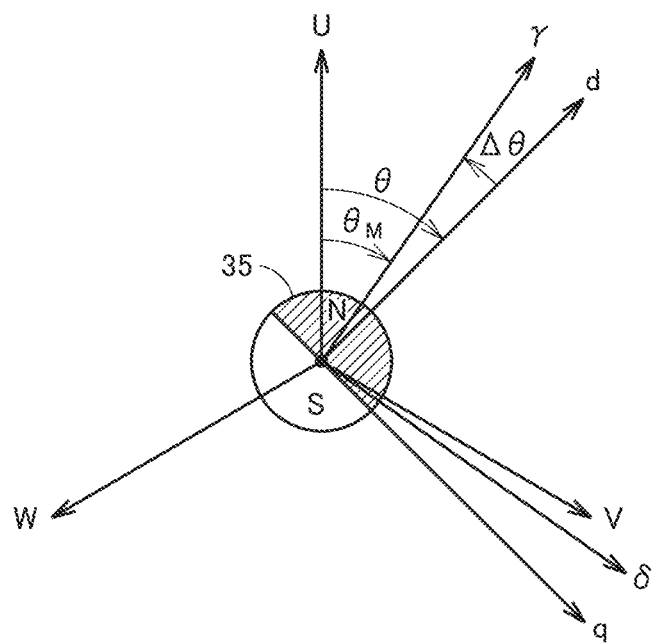
FIG. 3 is a diagram for illustrating coordinate axes for indicating an alternating current and a magnetic pole position in sensorless vector control.

FIG. 3 is a diagram for illustrating coordinate axes for indicating an alternating current and a magnetic pole position in sensorless vector control. The angle is shown by an electrical angle that is a phase of the output voltage and the output current from drive circuit 40.

Referring to FIG. 3, in vector control, a three-phase (a U-phase, a V-phase, a W-phase) alternating current flowing through stator winding 31 of three-phase brushless DC motor 30 is subjected to variable transformation into a two-phase component that rotates in synchronization with the permanent magnet of the rotor. Specifically, the direction of the magnetic pole of a rotor 35 is defined as a d-axis, and the direction in which the phase advances at an electrical angle of 90° from the d-axis is defined as a q-axis. Furthermore, the angle of the d-axis from the U-phase coordinate axis is defined as θ.

In the case of a sensorless vector control scheme as a control scheme not utilizing a position sensor for detecting the rotation angle of the rotor, the position information showing the rotation angle of the rotor needs to be estimated by a certain method. The estimated magnetic pole direction is defined as a γ-axis while the direction in which the phase advances at an electrical angle of 90° from the γ-axis is defined as a δ-axis. The angle of the γ-axis from the U-phase coordinate axis is defined as $θ_M$. The delay of $θ_M$ with respect to θ is defined as Δθ.

The coordinate axis in FIG. 3 is used also when the initial position of the magnetic pole of the rotor in the rest state is estimated in an inductive sensing scheme at the time when the motor is started. In this case, the true position of the magnetic pole of the rotor is indicated by an electrical angle θ. The electrical angle of the current that flows through stator winding 31 (also referred to as an energization angle or a voltage application angle) for estimating the initial position of the magnetic pole is indicated by $θ_M$.

[Configuration of Sensorless Vector Control Circuit]

Figure 4:
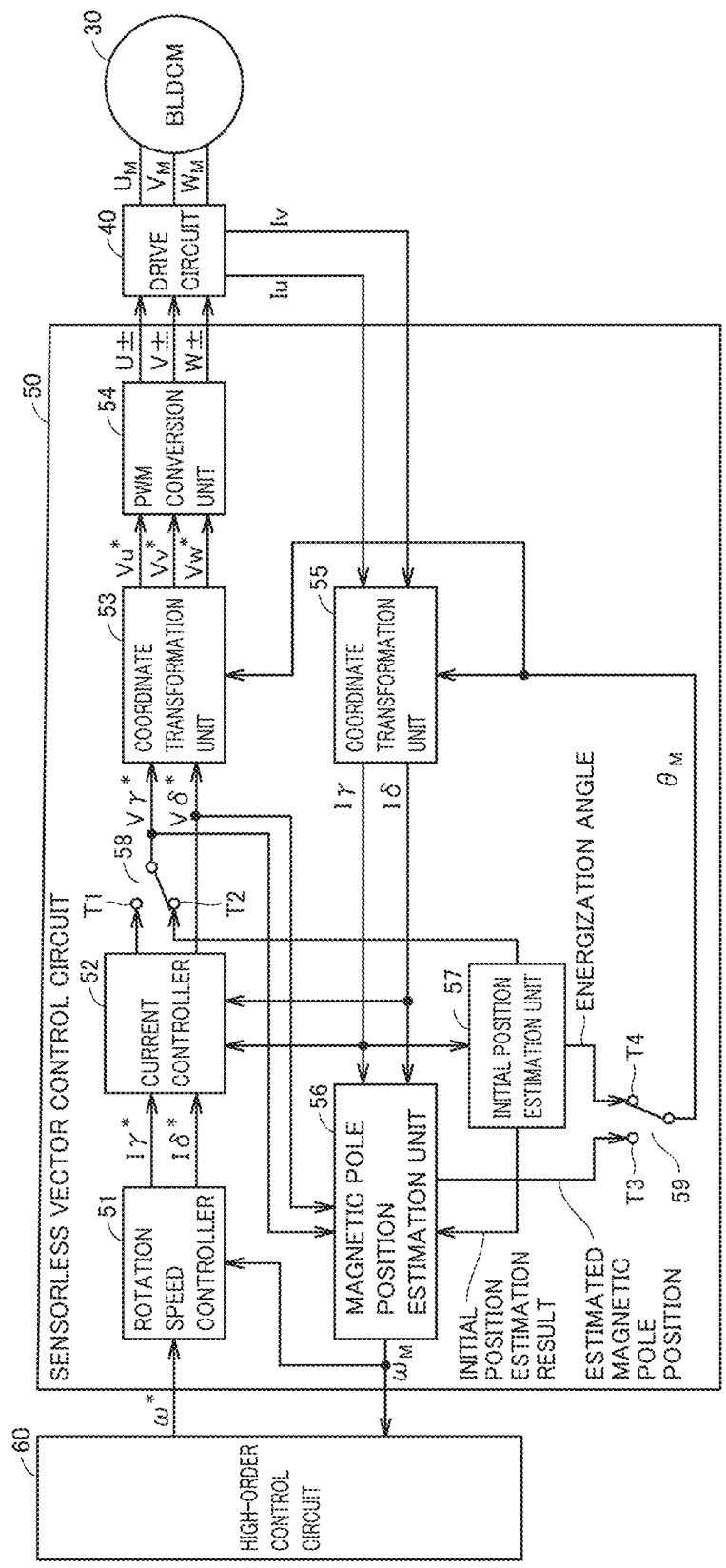
FIG. 4 is a functional block diagram showing the operation of a sensorless vector control circuit.

FIG. 4 is a functional block diagram showing the configuration and the operation of a sensorless vector control circuit. Referring to FIG. 4, sensorless vector control circuit 50 includes a coordinate transformation unit 55, a rotation speed controller 51, a current controller 52, a coordinate transformation unit 53, a PWM conversion unit 54, a magnetic pole position estimation unit 56, an initial position estimation unit 57, and connection changeover switches 58, 59.

Figure 5:
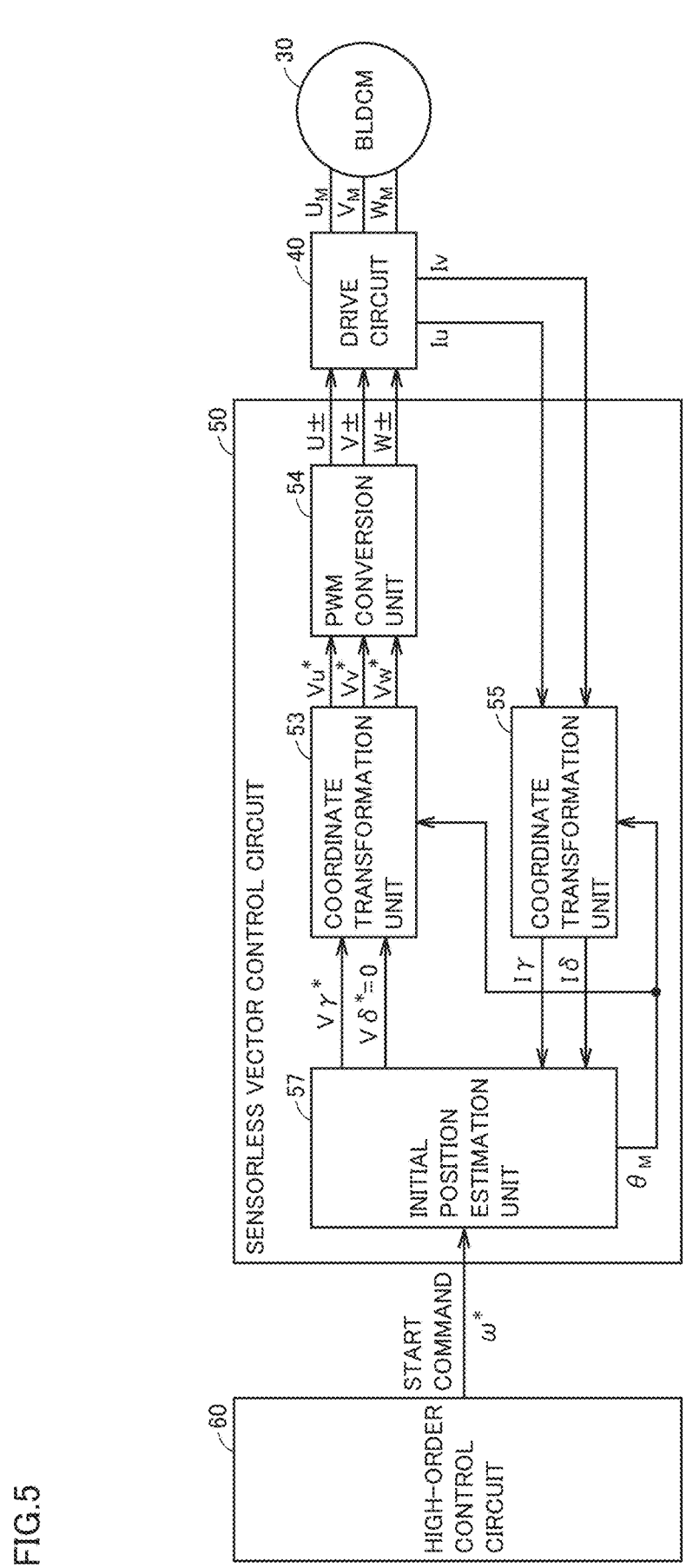
FIG. 5 is a functional block diagram showing a portion extracted from FIG. 4 and related to estimation of an initial position of a magnetic pole of a rotor in the rest state.

FIG. 5 is a functional block diagram showing a portion extracted from FIG. 4 and related to estimation of the initial position of the magnetic pole of the rotor in the rest state.

Referring to FIG. 4, during the operation of the motor, connection changeover switch 58 is switched to the T1 side, thereby connecting current controller 52 and coordinate transformation unit 53. Furthermore, connection changeover switch 59 is switched to the T3 side, thereby connecting coordinate transformation unit 55 and magnetic pole position estimation unit 56. On the other hand, when the initial magnetic pole position of the rotor is estimated while the motor is stopped, connection changeover switch 58 is switched to the T2 side, thereby connecting initial position estimation unit 57 and coordinate transformation unit 53. Furthermore, connection changeover switch 59 is switched to the T4 side, thereby connecting coordinate transformation unit 55 and initial position estimation unit 57.

In the following, the operation of sensorless vector control circuit 50 during the motor operation will be first simply described with reference to FIG. 4. It should be noted that the specific configuration of each of connection changeover switches 58 and 59 is not particularly limited. For example, the function of switching connection changeover switches 58 and 59 may be implemented by hardware such as a semiconductor switch or may be implemented by software.

Coordinate transformation unit 55 receives a signal showing U-phase current Iu detected in U-phase current detection circuit 43U of drive circuit 40 and a signal showing V-phase current Iv detected in V-phase current detection circuit 43V of drive circuit 40. Coordinate transformation unit 55 calculates W-phase current Iw from U-phase current Iu and V-phase current Iv. Then, coordinate transformation unit 55 performs coordinate transformation of U-phase current Iu, V-phase current Iv, and W-phase current Iw to thereby generate a γ-axis current Iγ and a δ-axis current Iδ. This is performed specifically according to the following procedure.

First, according to the following equation (1), coordinate transformation unit 55 transforms the currents of three phases including a U-phase, a V-phase, and a W-phase into two-phase currents of an α-axis current Iα and a β-axis current Iβ. This transformation is referred to as Clarke transformation.

$$\begin{pmatrix} I\alpha \\ I\beta \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} Iu \\ Iv \\ Iw \end{pmatrix} \quad (1)$$

Then, according to the following equation (2), coordinate transformation unit 55 transforms α-axis current Iα and β-axis current Iβ into a γ-axis current Iγ and a δ-axis current Iδ as a rotating system of coordinates. This transformation is referred to as Park transformation. In the following equation (2), $θ_M$ is an electrical angle of the magnetic pole direction estimated by magnetic pole position estimation unit 56, that is, an angle of the γ-axis from the U-phase coordinate axis. Coordinate transformation unit 55 receives the information about estimated magnetic pole position $θ_M$ from magnetic pole position estimation unit 56 through connection changeover switch 59.

$$\begin{pmatrix} I\gamma \\ I\delta \end{pmatrix} = \begin{pmatrix} \cos θ_M & \sin θ_M \\ -\sin θ_M & \cos θ_M \end{pmatrix} \begin{pmatrix} I\alpha \\ I\beta \end{pmatrix} \quad (2)$$

Rotation speed controller 51 receives a start command, a stop command and a target rotation angle speed ω* from high-order control circuit 60. Rotation speed controller 51 determines a γ-axis current command value Iγ* and a δ-axis current command value Iδ* to brushless DC motor 30 based on target rotation angle speed ω* and a rotation angle speed $ω_M$ of rotor 35 that is estimated by magnetic pole position estimation unit 56, for example, by proportional-integral (PI) control, proportional-integral-differential (PID) control or the like.

Current controller 52 determines a γ-axis voltage command value Vγ* and a δ-axis voltage command value Vδ*, for example, by PI control, PID control or the like based on γ-axis current command value Iγ* and δ-axis current command value Iδ* that are supplied from rotation speed controller 51, and γ-axis current Iγ and δ-axis current IS at present that are supplied from coordinate transformation unit 55.

Coordinate transformation unit 53 receives γ-axis voltage command value Vγ* and δ-axis voltage command value Vδ* from current controller 52. Coordinate transformation unit 53 and current controller 52 are connected to each other through connection changeover switch 58. Coordinate transformation unit 53 performs coordinate transformation of γ-axis voltage command value Vγ* and δ-axis voltage command value Vδ*, to thereby generate a U-phase voltage command value Vu*, a V-phase voltage command value Vv*, and a W-phase voltage command value Vw*. This is performed specifically according to the following procedure.

First, according to the following equation (3), coordinate transformation unit 53 transforms γ-axis voltage command value Vγ* and δ-axis voltage command value Vδ* into an α-axis voltage command value Vα* and a β-axis voltage command value Vβ*. This transformation is referred to as reverse Park transformation. In the following equation (3), $\theta_M$ is an electrical angle in the magnetic pole direction estimated by magnetic pole position estimation unit 56, that is, an angle of the γ-axis from the U-phase coordinate axis.

$$\begin{pmatrix} V\alpha^* \\ V\beta^* \end{pmatrix} = \begin{pmatrix} \cos\theta_M & \sin\theta_M \\ -\sin\theta_M & \cos\theta_M \end{pmatrix} \begin{pmatrix} V\gamma^* \\ V\delta^* \end{pmatrix} \quad (3)$$

Then, according to the following equation (4), coordinate transformation unit 53 transforms α-axis voltage command value Vα* and β-axis voltage command value Vβ* into U-phase voltage command value Vu*, V-phase voltage command value Vv*, and W-phase voltage command value Vw* of three phases. This transformation is referred to as reverse Clarke transformation. In addition, transformation of two phases of α and β into three phases of a U-phase, a V-phase, and a W-phase may be performed using space vector transformation in place of reverse Clarke transformation.

$$\begin{pmatrix} Vu^* \\ Vv^* \\ Vw^* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} V\alpha^* \\ V\beta^* \end{pmatrix} \quad (4)$$

Based on U-phase voltage command value Vu*, V-phase voltage command value Vv* and W-phase voltage command value Vw*, PWM conversion unit 54 generates inverter drive signals U+, U−, V+, V−, W+, and W− as PWM signals for driving the gates of transistors FU+, FU−, FV+, FV−, FW+, and FW−, respectively.

Magnetic pole position estimation unit 56 estimates rotation angle speed $\omega_M$ of rotor 35 at present and an electrical angle $\theta_M$ showing the magnetic pole position of rotor 35 at present based on γ-axis current Iγ and δ-axis current Iδ, and also on γ-axis voltage command value Vγ* and δ-axis voltage command value Vδ*. Specifically, magnetic pole position estimation unit 56 calculates rotation angle speed u at which the γ-axis induced voltage becomes zero, and estimates electrical angle $\theta_M$ showing the magnetic pole position based on rotation angle speed $\omega_M$. Magnetic pole position estimation unit 56 outputs the estimated rotation angle speed a to high-order control circuit 60 and also to rotation speed controller 51. Furthermore, magnetic pole position estimation unit 56 outputs the information about electrical angle $\theta_M$ showing the estimated magnetic pole position to coordinate transformation units 53 and 55.

[Estimation of Initial Position of Magnetic Pole of Rotor in Rest State]

The following is a detailed explanation about the procedure of estimating the initial position of the magnetic pole of the rotor in the rest state with reference to FIGS. 4 and 5.

Since magnetic pole position estimation unit 56 in FIG. 4 utilizes the induced voltage generated in stator winding 31, it cannot be used while the rotor is stopped. Thus, initial position estimation unit 57 for estimating the initial position of the magnetic pole of rotor 35 in an inductive sensing scheme is used in place of magnetic pole position estimation unit 56.

In this case, in the inductive sensing scheme, a constant voltage is applied continuously or intermittently by PWM to stator winding 31 while sequentially changing a plurality of energization angles, so as to detect a change in the current flowing through stator winding 31 at each energization angle. In this case, the time period of energization to stator winding 31 and the magnitude of the voltage applied to stator winding 31 are set at levels at which rotor 35 does not rotate. When the energization time period is extremely short or the magnitude of the voltage applied is extremely small the initial position of the magnetic pole cannot be detected, so that attention is required.

As described above, the method of estimating the initial position by inductive sensing utilizes the property of an effective inductance that slightly changes in accordance with the positional relation between the magnetic pole position of the rotor and the current magnetic field by the stator winding when the stator winding is applied with a voltage at a level not causing rotation of the rotor at a plurality of electrical angles. This change in inductance is based on the magnetic saturation phenomenon that remarkably occurs in the case of a d-axis current. Furthermore, in the case of an interior permanent magnet (IPM) motor having saliency by which the inductance in the q-axis direction becomes larger than the inductance in the d-axis direction, any change in inductance may be able to be detected even if no magnetic saturation occurs.

Specifically, the method often used for detecting the direction of the magnetic pole of the rotor is to set the command values for the energization time period and the applied voltage at each energization angle (specifically, the command value of the γ-axis voltage) to be constant, and detect a peak value of the γ-axis current within the energization time period to thereby determine that the energization angle at which the peak value attains a maximum value (that is, the energization angle at which an effective inductance attains a minimum value) corresponds to the magnetic pole direction.

However, as described above, when the energization time period and the magnitude of the applied voltage are limited to the levels at which the motor does not rotate, or depending on the structure and the characteristics of the motor, the energization angle at which the peak value of the γ-axis current attains a maximum value may not correspond to the direction of the magnetic pole, or there may be a plurality of energization angles at which the peak value attains a maximum value. The present disclosure provides a method that allows accurate detection of the initial position of the magnetic pole of the rotor even in the above-described case, which will be specifically described later with reference to FIGS. 11 to 16.

Referring to FIG. 5, sensorless vector control circuit 50 includes initial position estimation unit 57, coordinate transformation unit 53, PWM conversion unit 54, and coordinate transformation unit 55 as functions for estimating the initial position of the magnetic pole of rotor 35. Thus, the initial position of the magnetic pole of the rotor is estimated using a part of the function of vector control described with reference to FIG. 4. In the following, the functions of these units will be described in greater detail.

(1. Setting of γ-Axis Voltage Command Value, Energization Angle and Energization Time Period by Initial Position Estimation Unit)

Initial position estimation unit 57 sets the magnitude of γ-axis voltage command value Vγ*, electrical angle $\theta_M$ (also referred to as energization angle $\theta_M$) of each phase voltage to be applied to stator winding 31, and the energization time period. Initial position estimation unit 57 sets δ-axis voltage command value Vδ* at zero.

The magnitude of γ-axis voltage command value Vγ* and the length of the energization time period are set such that γ-axis current Iγ with a sufficient SN ratio is obtained in the range not causing rotation of rotor 35. Electrical angle $\theta_M$ is set at a plurality of angles in the range from 0 degree to 360 degrees. For example, initial position estimation unit 57 changes electrical angle $\theta_M$ in a range from 0 degree to 330 degrees by 30 degrees.

(2. Coordinate Transformation Unit 53)

Coordinate transformation unit 53 performs coordinate transformation of γ-axis voltage command value Vγ* and δ-axis voltage command value Vδ* (=0), to thereby generate U-phase voltage command value Vu*, V-phase voltage command value Vv*, and W-phase voltage command value Vw*. This coordinate transformation is performed, for example, using reverse Park transformation represented by the above-mentioned equation (3) and reverse Clarke transformation represented by the above-mentioned equation (4).

Specifically, U-phase voltage command value Vu*, V-phase voltage command value Vv*, and W-phase voltage command value Vw* are represented by the following equation (5). In the following equation (5), the amplitude of the voltage command value is defined as $V_0$.

$$\begin{cases} Vu^* = V_0\cos\theta_M \\ Vv^* = V_0\cos(\theta_M - 120°) \\ Vw^* = V_0\cos(\theta_M - 240°) \end{cases} \quad (5)$$

Figure 6:
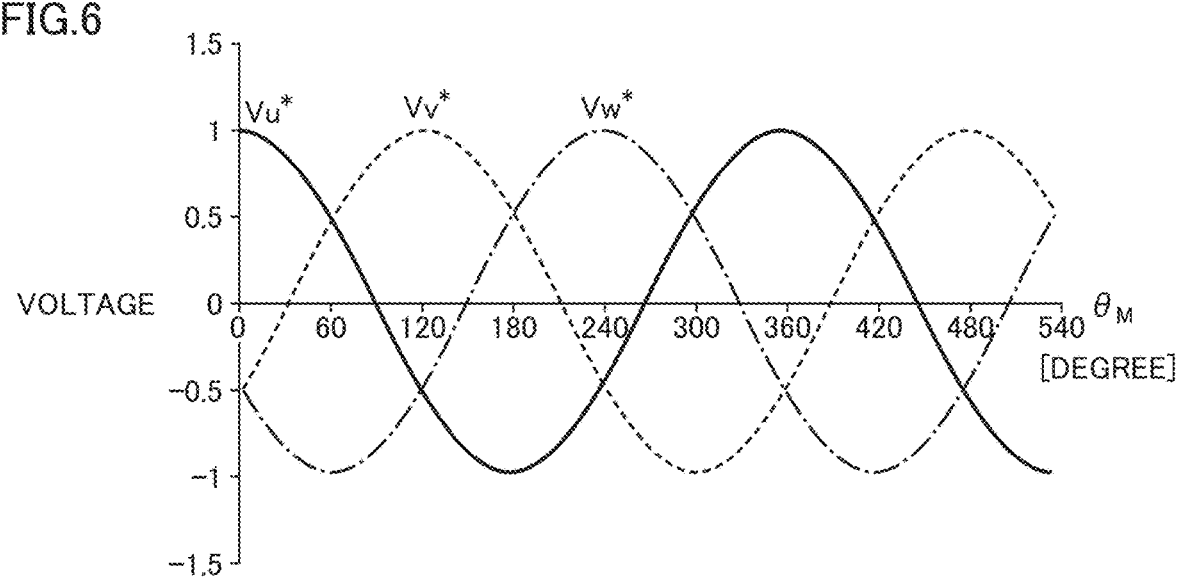
FIG. 6 is a diagram illustrating the relation between an electrical angle and each of a U-phase voltage command value, a V-phase voltage command value and a W-phase voltage command value.

FIG. 6 is a diagram illustrating the relation between the electrical angle and each of the U-phase voltage command value, the V-phase voltage command value and the W-phase voltage command value, shown in the above-mentioned equation (5). In FIG. 6, amplitude $V_0$ of the voltage command value in the above-mentioned equation (5) is normalized to 1.

Referring to FIG. 6, U-phase voltage command value Vu*, V-phase voltage command value Vv*, and W-phase voltage command value Vw* can be set with respect to $\theta_M$ that is arbitrarily set For example, when $\theta_M$=0°, then, Vu*=1 and Vv*=Vw*=−0.5. When $\theta_M$=30°, then, Vu*=(√3)/2, Vv*=0, and Vw*=−(√3)/2.

(3. PWM Conversion Unit 54)

Again referring to FIG. 5, based on U-phase voltage command value Vu*, V-phase voltage command value Vv* and W-phase voltage command value Vw*. PWM conversion unit 54 generates inverter drive signals U+, U−, V+, V−, W+, and W− as PWM signals for driving the gates of transistors FU+, FU−, FV+, FV−, FW+, and FW−, respectively.

According to the generated inverter drive signals U+, U−, V+, V−, W+, and W−, drive circuit 40 supplies U-phase voltage $U_M$, V-phase voltage $V_M$, and W-phase voltage $W_M$ to U-phase winding 31U, V-phase winding 31V, and W-phase winding 31W, respectively, of brushless DC motor 30. The total number of pulses of the inverter drive signals corresponds to the energization time period that has been set. U-phase current detection circuit 43U and V-phase current detection circuit 43V that are provided in drive circuit 40 detect U-phase current Iu and V-phase current Iv, respectively. The signals showing the detected U-phase current Iu and V-phase current Iv are input into coordinate transformation unit 55.

(4. Coordinate Transformation Unit 55)

Coordinate transformation unit 55 calculates W-phase current Iw based on U-phase current Iu and V-phase current Iv. Then, coordinate transformation unit 55 performs coordinate transformation of U-phase current Iu, V-phase current Iv, and W-phase current Iw, to thereby generate γ-axis current Iγ and δ-axis current Iδ. This coordinate transformation is performed using Clarke transformation in the above-mentioned equation (1) and Park transformation in the above-mentioned equation (2).

In this case, γ-axis current Iγ corresponds to the current component having the same electrical angle as that of the energization angle. Also, δ-axis current Iδ corresponds to the current component that is different in electrical angle by 90 degrees from the energization angle. In the present specification, γ-axis current Iγ is also referred to as the first current component while δ-axis current Iδ is also referred to as the second current component.

In addition, if there is no difference in electrical property and magnetic property among the U-phase, the V-phase and the W-phase, and also if there is no influence of the permanent magnet of rotor 35, the ratio among U-phase current Iu, V-phase current Iv, and W-phase current Iw should be equal to the ratio among voltage command values Vu*, Vv*, and Vw*. Accordingly, in this virtual case, δ-axis current Iδ is zero irrespective of the energization angle while γ-axis current Iγ is a fixed value irrespective of the energization angle. In fact, however, the magnitude of γ-axis current Iγ changes in accordance with the position of the permanent magnet of the rotor. Also, the electrical property and the magnetic property vary among the phases depending on the structures of the stator and the rotor, so that the magnitude of γ-axis current Iγ changes.

Figure 7:
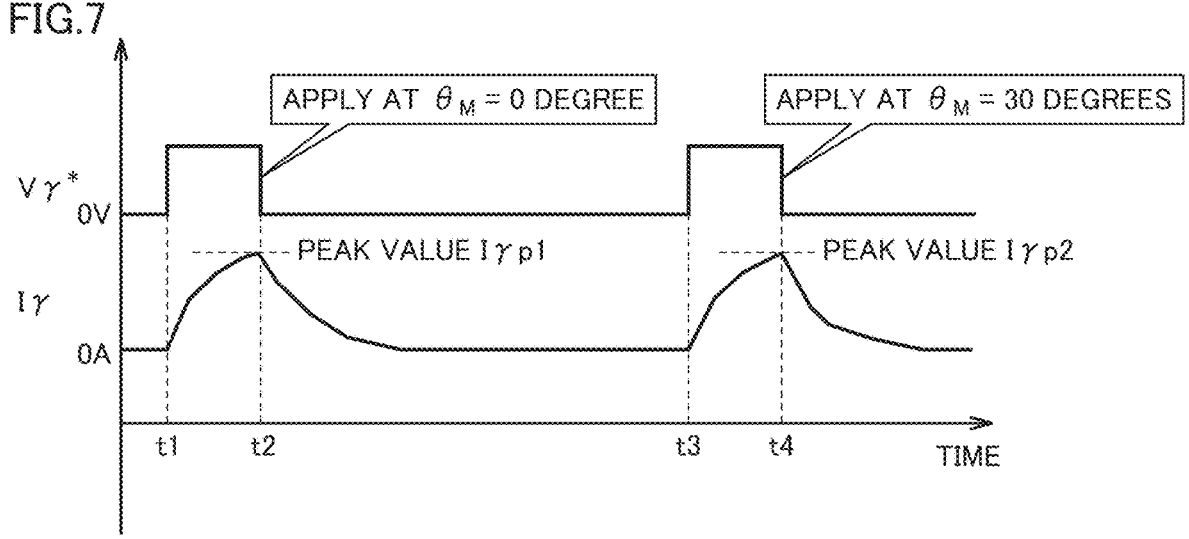
FIG. 7 is a timing chart schematically illustrating an example of the relation between a γ-axis voltage command value and the detected γ-axis current.

FIG. 7 is a timing chart schematically illustrating an example of the relation between γ-axis voltage command value Vγ* and the detected γ-axis current Iγ.

Referring to FIG. 7, in a time period from a time point t1 to a time point t2, initial position estimation unit 57 in FIG. 5 first sets energization angle $\theta_M$ at zero degree and also sets γ-axis voltage command value Vγ* at a prescribed set value. Thereby, pulse-width-modulated U-phase voltage $U_M$, V-phase voltage $V_M$ and W-phase voltage $W_M$ are applied to U-phase winding 31U. V-phase winding 31V, and W-phase winding 31W, respectively, of the stator. As a result, in a time period from time point t1 to time point t2, γ-axis current Iγ gradually increases from 0A and reaches a peak value Iγp1 at time point t2. At and after time point t2, voltage application to stator winding 31 is stopped, so that γ-axis current Iγ gradually decreases. During a time period until a time point t3 at which a voltage is applied to stator winding 31 next time, the values of U-phase current Iu, V-phase current Iv, and W-phase current Iw return to zero, with the result that the value of γ-axis current Iγ also returns to zero.

Then, in a time period from time point t3 to a time point t4, initial position estimation unit 57 sets energization angle $\theta_M$ at 30 degrees and also sets γ-axis voltage command value Vγ* at the same set value as the previous value. As a result, γ-axis current Iγ gradually increases from 0A in a time period from time point t3 to time point t4, and reaches a peak value Iγp2 at time point t4. At and after time point t4, voltage application to stator winding 31 is stopped, so that γ-axis current Iγ gradually decreases.

Subsequently, in a similar manner, the set angle of energization angle $\theta_M$ is changed. Then, at the changed energization angle $\theta_M$, a pulse-width-modulated constant voltage is applied to stator winding 31. In this case, γ-axis voltage command value Vγ* is the same at each energization angle while the energization time period is also the same at each energization angle. Then, the peak value of γ-axis current Iγ at the end of voltage application is detected.

(5. Estimation of Magnetic Pole Position of Rotor by Initial Position Estimation Unit)

Again referring to FIG. 5, initial position estimation unit 57 estimates the position of the magnetic pole of rotor 35 based on the peak value of γ-axis current Iγ obtained with respect to each of the plurality of energization angles $\theta_M$. As shown in FIG. 4, initial position estimation unit 57 outputs the result of estimation of the initial magnetic pole position of rotor 35 to magnetic pole position estimation unit 56. Magnetic pole position estimation unit 56 starts brushless DC motor 30 using this result of estimation of the initial magnetic pole position.

Ideally, energization angle $\theta_M$ at which the peak value of γ-axis current Iγ attains a maximum value is approximately equivalent to an initial magnetic pole position θ of rotor 35. In practice, however, position θ of the magnetic pole of rotor 35 is often not equivalent to energization angle $\theta_A$ at which the peak value of γ-axis current Iγ attains a maximum value.

Figure 8A:
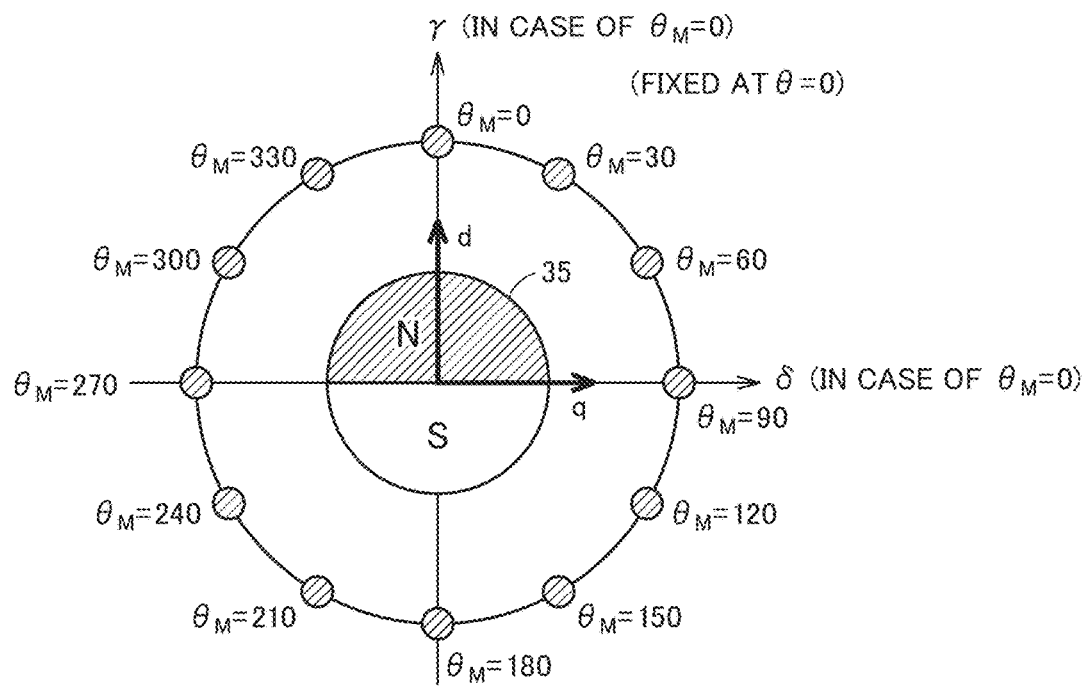
FIGS. 8A and 8B each are a diagram illustrating the relation between: a peak value of the γ-axis current; and the relative positional relation between the magnetic pole position of the rotor and an energization angle.
Figure 8B:
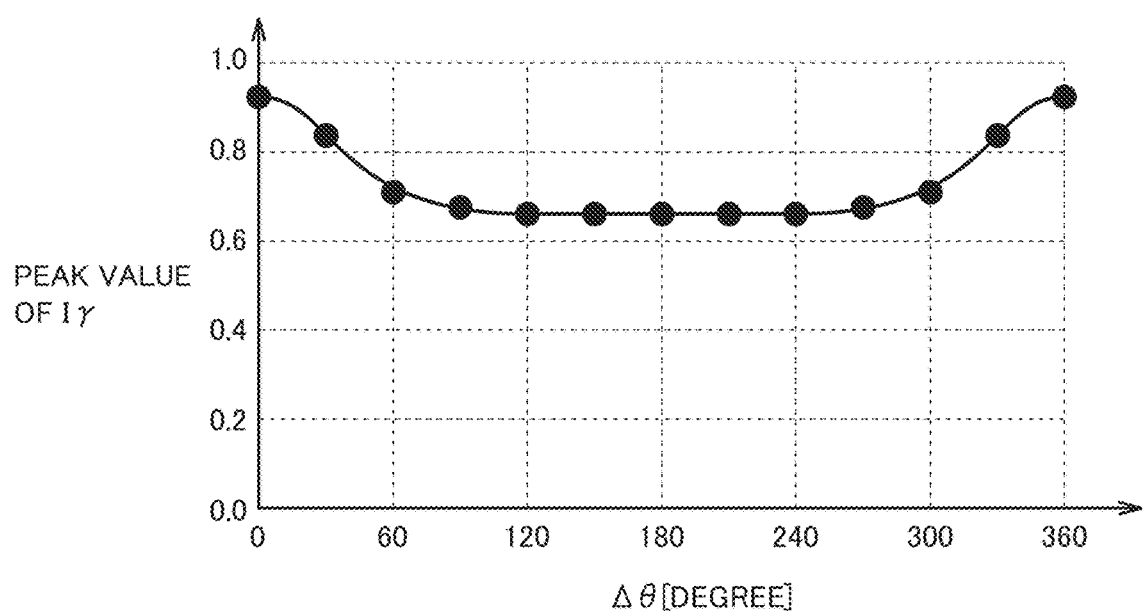

FIGS. 8A and 8B each are a diagram illustrating the relation between: the peak value of the γ-axis current; and the relative positional relation between the magnetic pole position of the rotor and the energization angle. First, referring to FIG. 8A, the relative positional relation between magnetic pole position θ of rotor 35 and energization angle $\theta_M$ will be described below.

In the case of FIG. 8A, magnetic pole position θ of rotor 35 is fixed at 0°. Accordingly, the d-axis is set in the direction of an electrical angle 0° while the q-axis is set in the direction of an electrical angle 90°. On the other hand, energization angle $\theta_M$ changes from 0° to 330° by 30°. FIG. 8A shows a γ-axis and a δ-axis in the case where energization angle $\theta_M$ is 0°. In this case, Δθ=0°.

Then, referring to FIG. 8B, the relation between the peak value of γ-axis current Iγ and an angle difference Δθ between magnetic pole position θ and energization angle $\theta_M$ will be described. In FIG. 8B, the horizontal axis shows angle difference Δθ while the vertical axis shows a peak value of γ-axis current Iγ. The unit of the vertical axis is an arbitrary unit.

As shown in FIG. 8B, ideally, when angle difference Δθ between magnetic pole position θ and energization angle Δθ is 0°, that is, when magnetic pole position θ is equal to energization angle $\theta_M$ (the case where θ=$\theta_M$=0° in FIG. 8A), the peak value of γ-axis current Iγ shows a maximum value. In practice, however, energization angle $\theta_M$ at which the peak value of γ-axis current Iγ attains a maximum value is often not equivalent to magnetic pole position θ. Initial position estimation unit 57 in the present embodiment can accurately determine magnetic pole position θ of the rotor even in the above-described case. The specific operation of initial position estimation unit 57 will be described later in detail.

[Specific Example of Problem about Inductive Sensing Scheme]

As described above, when the length of the energization time period and the magnitude of the applied voltage each are limited to the level at which the motor does not rotate, or depending on the structure and the characteristics of the motor, the energization angle at which the peak value of the γ-axis current attains a maximum value may not be equivalent to the direction of the magnetic pole. In the following, a specific example in such a case will be described.

Figure 9A:
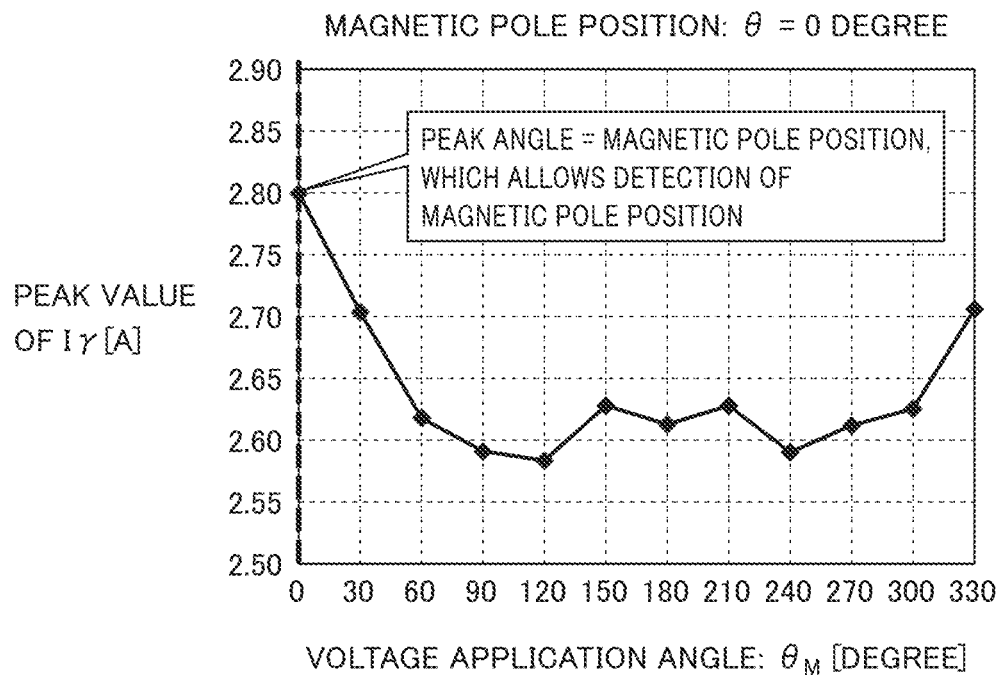
FIGS. 9A and 9B each are a diagram showing an actual measurement example of the peak value of the γ-axis current detected by an inductive sensing scheme.
Figure 9B:
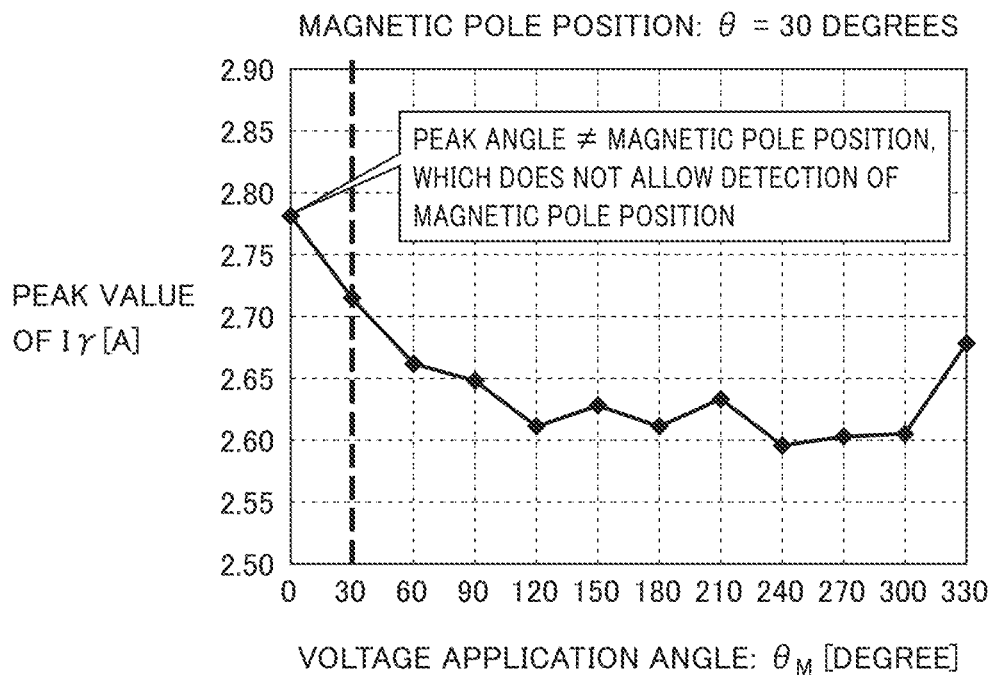

FIGS. 9A and 9B each are a diagram showing an actual measurement example of the peak value of the γ-axis current detected by the inductive sensing scheme. FIG. 9A shows the case where magnetic pole position θ of the rotor is 0° while FIG. 9B shows the case where magnetic pole position θ of the rotor is 30°.

Figure 10A:
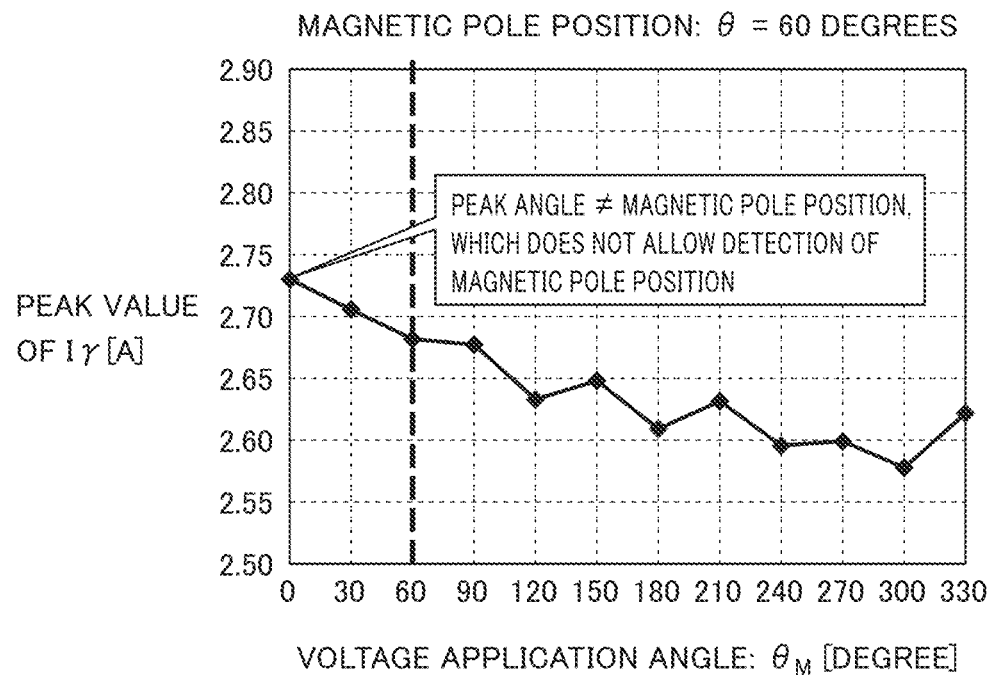
FIGS. 10A and 10B each are a diagram showing another actual measurement example of the peak value of the γ-axis current detected by the inductive sensing scheme.
Figure 10B:
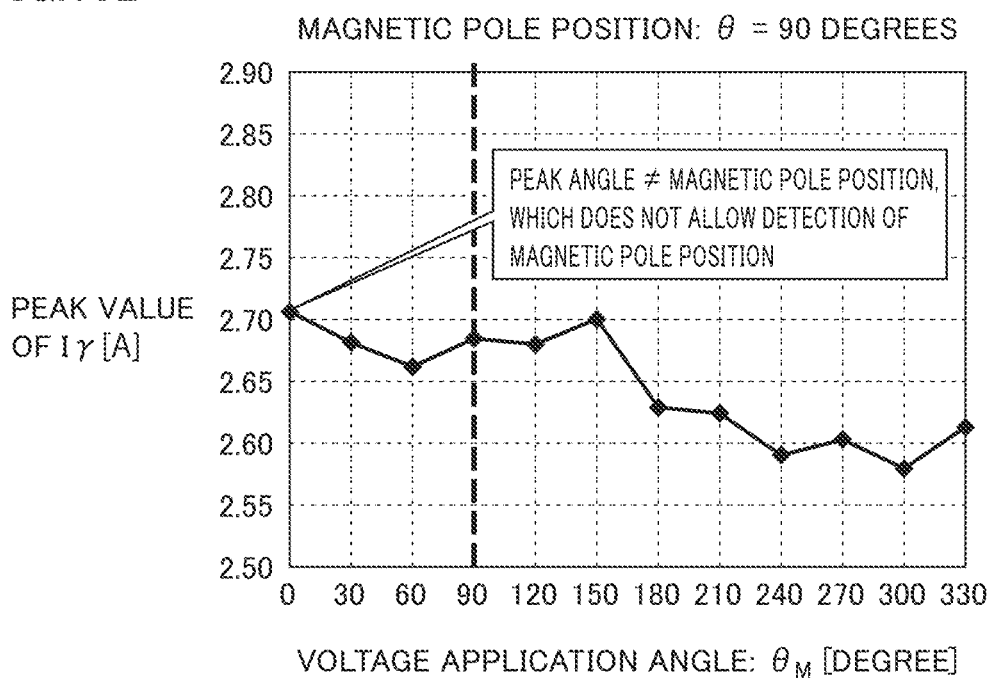

Furthermore, FIGS. 10A and 10B each are a diagram showing another actual measurement example of the peak value of the γ-axis current detected by the inductive sensing scheme. FIG. 10A shows the case where magnetic pole position θ of the rotor is 60° while FIG. 10B shows the case where magnetic pole position θ of the rotor is 90°. In FIGS. 9A, 9B, 10A, and 10B, the horizontal axis shows a voltage application angle $\theta_M$ (which will be also referred to as an energization angle) of the stator winding while the vertical axis shows a peak value of γ-axis current Iγ at each voltage application angle $\theta_M$.

In the case shown in FIG. 9A, rotor magnetic pole position θ=0° coincides with voltage application angle $\theta_M$=0° at which γ-axis current Iγ attains a peak value. In the case shown in FIG. 9B, however, rotor magnetic pole position θ=30° is different from voltage application angle $\theta_M$=0° at which γ-axis current Iγ attains a peak value. Similarly, in the case shown in FIG. 10A, rotor magnetic pole position θ=60° is different from voltage application angle $\theta_M$=0° at which γ-axis current Iγ attains a peak value. Also in the case shown in FIG. 10B, rotor magnetic pole position θ=90° is different from voltage application angle $\theta_M$=0° at which γ-axis current Iγ attains a peak value.

Also in the case as described above, initial position estimation unit 57 in the present embodiment can accurately estimate magnetic pole position θ of the rotor. In the following, a specific initial position estimation method in initial position estimation unit 57 will be described.

[Details of Operation of Initial Position Estimation Unit]

(1. Functional Block Diagram)

Figure 11:
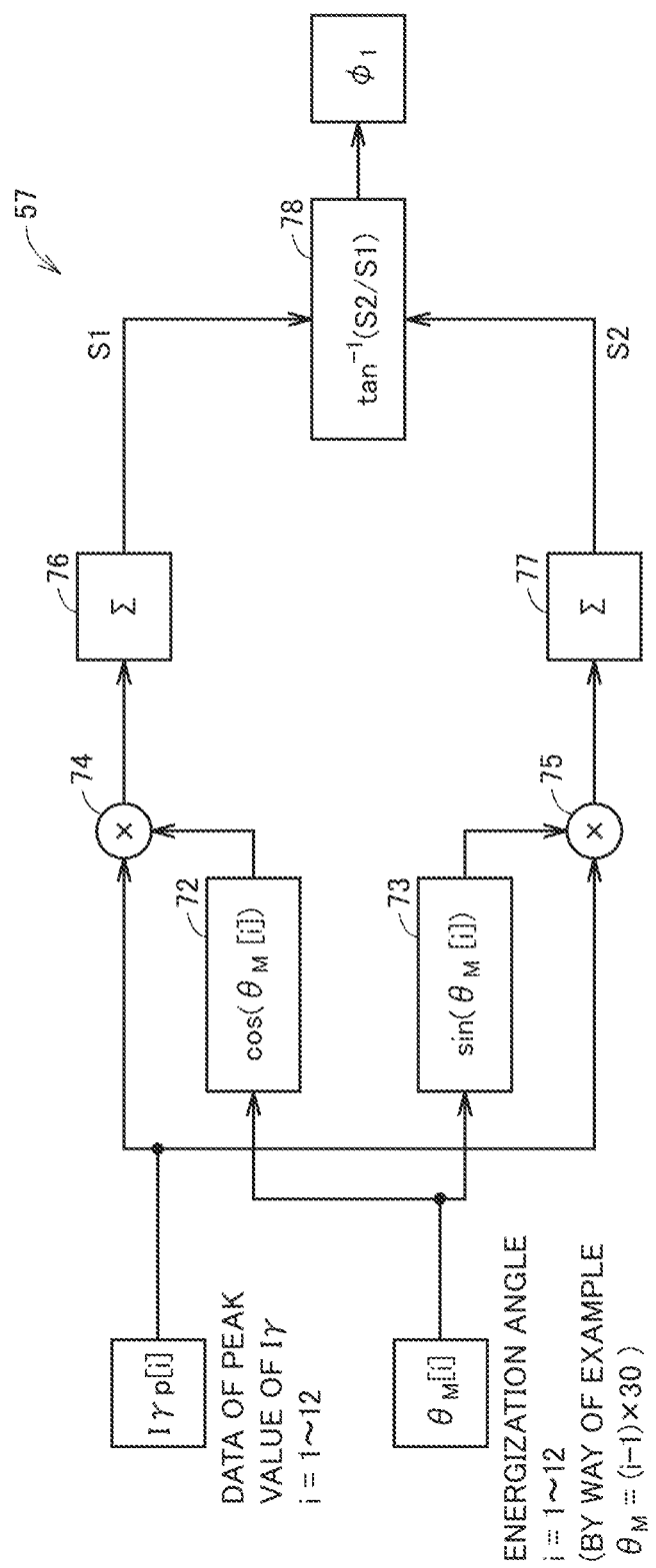
FIG. 11 is a functional block diagram showing an operation of an initial position estimation unit in FIG. 5.

FIG. 11 is a functional block diagram showing the operation of initial position estimation unit 57 in FIG. 5. Referring to FIG. 11, initial position estimation unit 57 includes a cosine computing unit 72, a sine computing unit 73, multipliers 74 and 75, integrators 76 and 77, and an initial position computing unit 78.

Cosine computing unit 72 and sine computing unit 73 each receive energization angle $\theta_M$ that is set. For example, an energization angle $\theta_M[i]$ is set at (i−1)×30° in accordance with number i (i is an integer equal to or greater than 1 and equal to or less than 12). For example, energization angle $\theta_M=0°$ on the condition that i=0, and energization angle $\theta_M=330°$ on the condition that i=12.

Cosine computing unit 72 calculates a cosine function value $\cos(\theta_M[i])$ of the received energization angle $\theta_M$. Sine computing unit 73 calculates a sine function value $\sin(\theta_M[i])$ of the received energization angle $\theta_M$. In place of actually calculating a trigonometric function value, the calculation result of the trigonometric function value may be stored in the form of a table in advance in memory, from which the cosine function value and the sine function value corresponding to energization angle $\theta_M$ may be read.

FIG. 12 is a diagram showing an example of a trigonometric function table used in the initial position estimation unit. As shown in FIG. 12, for each number i, energization angle $\theta_M[i]$, cosine function value $\cos(\theta_M[i])$ corresponding to energization angle $\theta_M$, and sine function value $\sin(\theta_M[i])$ corresponding to energization angle $\theta_M$ are stored in the memory as a trigonometric function table. While sequentially updating number i, initial position estimation unit 57 reads, from the memory, energization angle $\theta_M[i]$, cosine function value $\cos(\theta_M[i])$, and sine function value $\sin(\theta_M[i])$, each of which corresponds to number i.

Again referring to FIG. 11, at each energization angle $\theta_M[i]$, multiplier 74 multiplies a peak value $I\gamma p[i]$ of $\gamma$-axis current $I\gamma$ corresponding to energization angle $\theta_M[i]$ by cosine function value $\cos(\theta_M[i])$ corresponding to energization angle $\theta_M[i]$. This computation is performed each time number i is updated. Integrator 76 integrates the results of computation by multiplier 74 that are obtained at each energization angle $\theta_M[i]$. The integrated value (that is, a total sum) of the results of computation by multiplier 74 for all energization angles $\theta_M[i]$ is defined as an integrated value S1.

Similarly, at each energization angle $\theta_M[i]$, multiplier 75 multiplies peak value $I\gamma p[i]$ of $\gamma$-axis current $I\gamma$ corresponding to energization angle $\theta_M[i]$ by sine function value $\sin(\theta_M[i])$ corresponding to energization angle $\theta_M[i]$. This computation is performed each time number i is updated. Integrator 77 integrates the results of computation by multiplier 75 that are obtained at each energization angle $\theta_M[i]$. The integrated value (that is, a total sum) of the results of computation by multiplier 75 for all energization angles $\theta_M[i]$ is defined as an integrated value S2.

Based on integrated value S1 calculated by integrator 76 and integrated value S2 calculated by integrator 77, specifically based on the ratio between integrated values S1 and S2, initial position computing unit 78 calculates a phase angle $\phi_1$ of the approximate curve by a trigonometric function, as will be described below in detail. Phase angle $\phi_1$ corresponds to the phase of the trigonometric function on the condition that energization angle $\theta_M=0$, that is, corresponds to a so-called initial phase. It should be noted that phase angle $\phi_1$ also includes the case where the sign of the initial phase is reversed. Based on this phase angle $\phi_1$ initial position computing unit 78 calculates the estimate value of the initial position of the magnetic pole of the rotor. More specifically, when the approximate curve by a trigonometric function is assumed to be $A_0+A_1\cdot\cos(\theta_M-\phi_1)$, the estimate value of the initial position of the magnetic pole of the rotor becomes equal to phase angle $\phi_1$. Furthermore, phase angle $\phi_1$ can be calculated by the inverse tangent of the ratio between integrated value S1 and integrated value S2, that is, by $\tan^{-1}(S2/S1)$.

(2. Theory of Estimate Calculation)

The following is an explanation about the theory based on which the initial position of the magnetic pole of the rotor can be estimated through the above-mentioned procedure.

Peak values $I\gamma p$ of the $\gamma$-axis current that are obtained in accordance with energization angles $\theta_M$ are arranged sequentially in order of energization angles $\theta_M$ so as to plot a graph. The waveform of the obtained peak values $I\gamma p$ of the $\gamma$-axis current is assumed to be approximated by a trigonometric function curve. Specifically, as shown in the following equation (6), it is assumed that peak value $I\gamma p$ of the $\gamma$-axis current as a function of $\theta_M$ is expanded in a series of a plurality of cosine functions having different cycles.

$$I\gamma p(\theta_M) = A_0 + A_1\cos(\theta_M-\phi_1) + A_2\cos(2\theta_M-\phi_2) + A_3\cos(3\theta_M-\phi_3) + \ldots \quad (6)$$

In the above-mentioned equation (6), $A_0, A_1, A_2, \ldots$ each show a coefficient, and $\phi_1, \phi_2, \phi_3, \ldots$ each show a phase angle. The first term on the right side of the above-mentioned equation (6) shows a prescribed component irrespective of ONE; the second term on the right side shows the first-order component having a cycle of 360°; and the third term on the right side shows the second-order component having a cycle of 180°. The fourth and subsequent terms show higher order components.

Then, the above-mentioned equation (6) is multiplied by $\cos(\theta_M)$, and $\theta_M$ is subjected to an integration computation in an integration section from $-\pi$ to $\pi$. By this computation, the first term on the right side of the above-mentioned equation (6) results in zero, and also, the third and subsequent terms on the right side of the equation (6) also results in zero. Thus, only the computation result in the second term on the right side remains, so that the following equation (7) is eventually obtained. Since the above-mentioned integration calculation corresponds to the above-mentioned calculation of integrated value S1, the integrated value is denoted as S1.

$$\begin{aligned} S_1 &= \int_{-\pi}^{\pi} I\gamma p(\theta_M)\cos\theta_M\,d\theta_M \\ &= \int_{-\pi}^{\pi} A_1\cos(\theta_M-\phi_1)\cos\theta_M\,d\theta_M \\ &= A_1\cos\phi_1\int_{-\pi}^{\pi}\cos\theta_M\cos\theta_M\,d\theta_M + \\ &\quad A_1\sin\phi_1\int_{-\pi}^{\pi}\sin\theta_M\cos\theta_M\,d\theta_M \\ &= A_1\pi\cos\phi_1 \end{aligned} \quad (7)$$

Similarly, the above-mentioned equation (6) is multiplied by sin (Or), and $\theta_M$ is subjected to integration computation in an integration section from $-\pi$ to $\pi$. By this computation, the first term on the right side of the above-mentioned equation (6) results in zero, and also, the third and subsequent terms on the right side of the equation (6) results in zero. Thus, only the computation result in the second term on the right side remains, so that the following equation (8) is eventually obtained. Since the above-mentioned integration calculation corresponds to the above-mentioned calculation of integrated value S2, the integrated value is denoted as S2.

$$\begin{aligned} S_2 &= \int_{-\pi}^{\pi} I\gamma p(\theta_M)\sin\theta_M\,d\theta_M \\ &= \int_{-\pi}^{\pi} A_1\cos(\theta_M-\phi_1)\sin\theta_M\,d\theta_M \\ &= A_1\cos\phi_1\int_{-\pi}^{\pi}\cos\theta_M\sin\theta_M\,d\theta_M + \\ &\quad A_1\sin\phi_1\int_{-\pi}^{\pi}\sin\theta_M\sin\theta_M\,d\theta_M \\ &= A_1\pi\sin\phi_1 \end{aligned} \quad (8)$$

By calculating an inverse tangent using the ratio between integrated value S1 in the above-mentioned equation (7) and integrated value S2 in the above-mentioned equation (8), phase angle $\phi_1$ can be calculated as shown in the following equation (9).

$$\phi_1 = \tan^{-1}\left(\frac{S_2}{S_1}\right) \quad (9)$$

The above-mentioned calculation can be considered as approximating the change of peak value Iγp of the γ-axis current with respect to energization angle $\theta_M$ by the trigonometric function having a cycle of 360° (that is, one cycle of the electrical angle). In other words, the change of peak value Iγp of the γ-axis current with respect to energization angle $\theta_M$ is approximated by $A_0+A_1 \cdot \cos(\theta_M-\phi_1)$. This approximation equation has a maximum value $A_0+A_1$ on the condition that $\theta_M=\phi_1$. Accordingly, $\phi_1$ that is an electrical angle at which the approximation equation has a maximum value can be estimated as a magnetic pole position of the rotor.

It should be noted that the approximation equation of the trigonometric function curve is not limited to the above-mentioned equations. For example, the following is an explanation about the case where the change of peak value Iγp of the γ-axis current with respect to energization angle $\theta_M$ is approximated by $A_0+A_1 \cdot \sin(\theta_M+\phi_1)$. In this case, by calculating integrated values S1 and S2 in the same manner as described above, phase angle $\phi_1$ can be calculated by $\tan^{-1}(S1/S2)$. It should be noted that the ratio between integrated value S1 and integrated value S2 is reversed from the equation (9). This approximation equation has a maximum value $A_0+A_1$ on the condition that $\theta_M=90°-\phi_1$. Accordingly, 90°−$\phi_1$, that is an electrical angle $\theta_M$ at which the approximation equation has a maximum value can be estimated as a magnetic pole position of the rotor.

The above description has been made with reference to an integration calculation assuming that energization angle $\theta_M$ continuously changes. When energization angle $\theta_M$ is discrete, integration calculation is changed to total sum calculation as shown in the following equation (10), but the calculation manner is basically the same. The following equation (10) represents the case where there are 12 energization angles θ at each 30°, which is equivalent to the calculation in the above-described case in FIG. 11. In general assuming that the number of energization times in one cycle of the electrical angle is defined as L times, the coefficient of 2π/L is multiplied as shown in the following equation (10).

$$\begin{cases} S_1 = \frac{2\pi}{12}\sum_{i=1}^{12} I\gamma p[i]\cos(\theta[i]) \\ S_2 = \frac{2\pi}{12}\sum_{i=1}^{12} I\gamma p[i]\sin(\theta[i]) \end{cases} \quad (10)$$

(3. One Example of Result of Initial Position Estimation)

Figure 13:
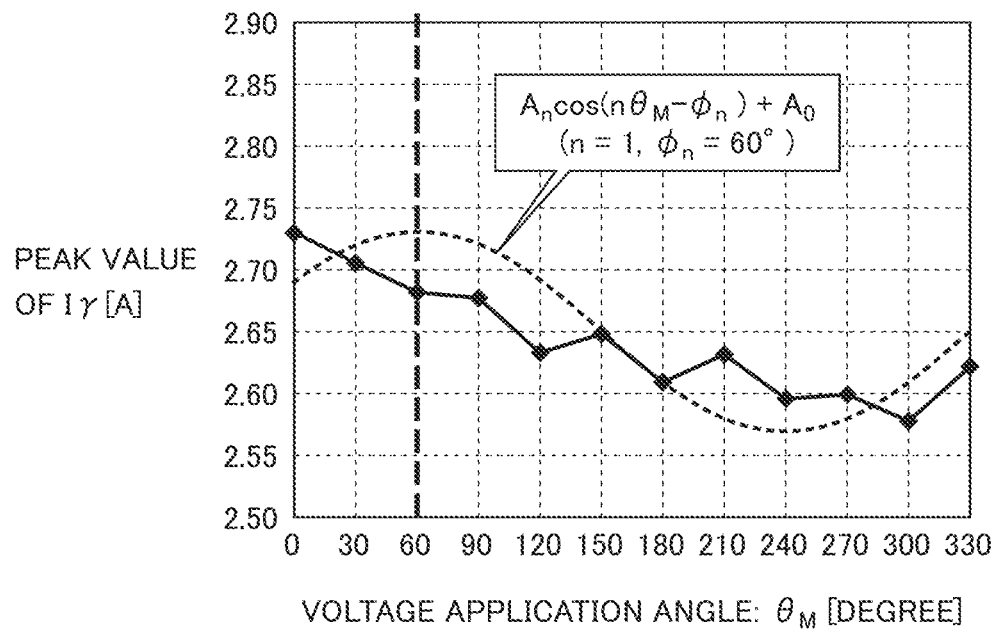
FIG. 13 is a diagram showing an example of a result of initial position estimation according to the present embodiment in the actual measurement example in FIG. 10A.

FIG. 13 is a diagram showing an example of a result of initial position estimation according to the present embodiment in the actual measurement example in FIG. 10A.

The above-mentioned FIG. 10A shows the measurement result of peak value Iγp of the γ-axis current at each energization angle $\theta_M$ in the case where magnetic pole position θ of the rotor is 60°. This measurement result of peak value Iγp of the γ-axis current is assumed to be approximated by the approximation equation of $A_0+A_n \cdot \cos(n \cdot \theta_M - \phi_n)$ using a trigonometric function. It should be noted that n=1, that is, the cycle corresponds to one cycle of the electrical angle. Consequently, as indicated by a broken line in FIG. 13, the measurement result can be approximated by the approximate curve having a maximum value on the condition that $\phi_1=60°$. Then, when this maximum value is obtained, energization angle $\theta_M$ (that is, $\phi_1=60°$) is estimated as an initial position of the magnetic pole of the rotor. In this case, the above-mentioned specific method of calculating electrical angle $\phi_1$ is as described with reference to FIG. 11.

(4. Flowchart)

Figure 14:
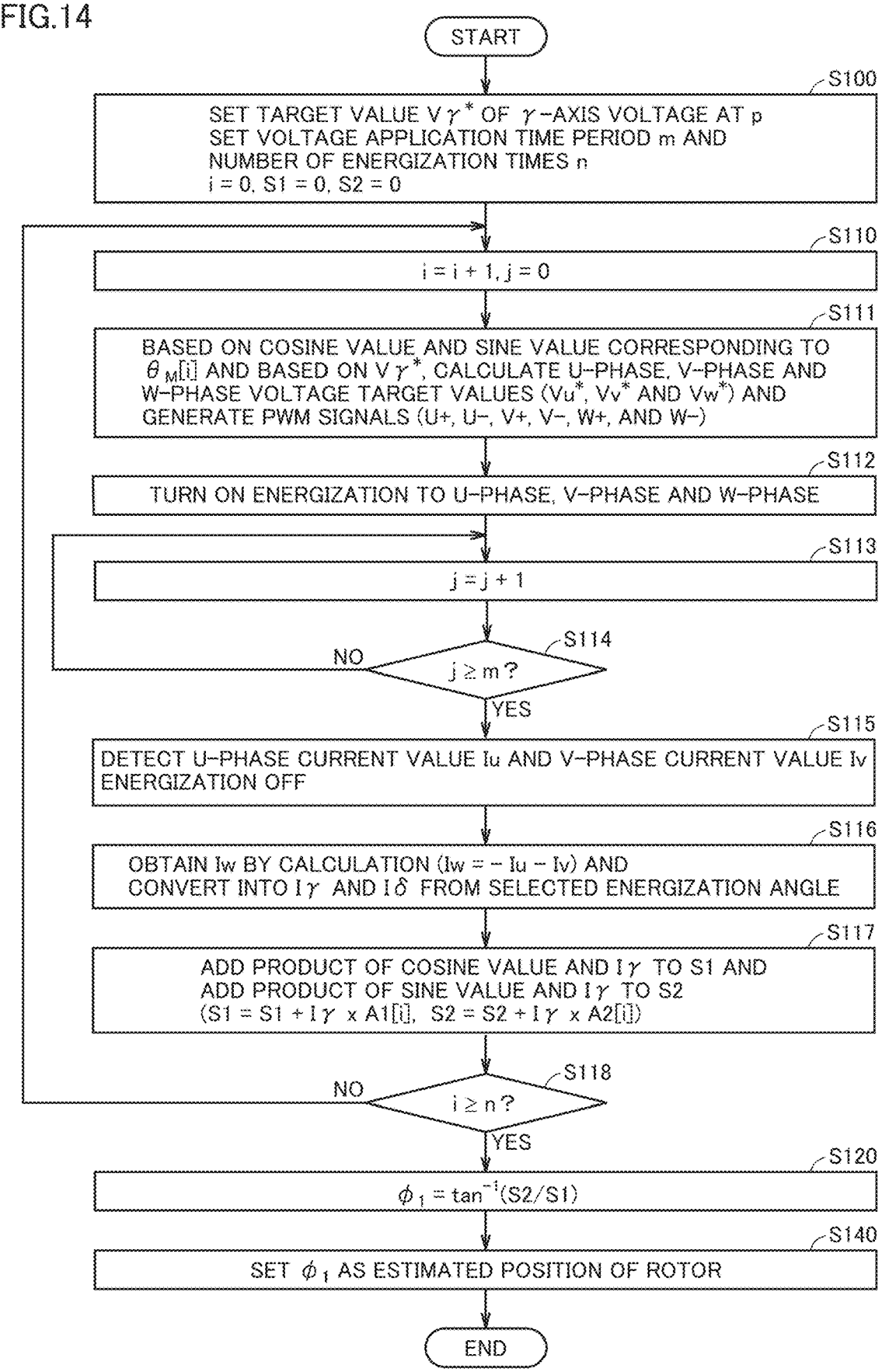
FIG. 14 is a flowchart illustrating an example of the operation of the initial position estimation unit in FIG. 5.

FIG. 14 is a flowchart illustrating an example of the operation of initial position estimation unit 57 in FIG. 5. The following is a summary of the previous description mainly with reference to FIGS. 5 and 14.

In step S100 in FIG. 14, γ-axis voltage command value Vγ* is set at p, the time period in which a voltage is applied to stator winding 31 at each energization angle $\theta_M$ (that is, an energization time period) is set, and a total number of energization times n is set. For example, when a voltage is applied to stator winding 31 at each 30 degrees, total number of energization times n is set at 12. The energization time period can be controlled by a maximum number m of the PWM pulses to be output.

The parameter at which the number of energization times is counted is defined as i. Parameter i is initialized to an initial value 0. Also, the parameter showing the energization time period is defined as j. Parameter j is counted up from 0 to m. Furthermore, integrated values S1 and S2 are initialized to zero.

In this case, energization angle $\theta_M[i]$ corresponding to number of energization times i is stored in the form of a table in memory in advance, for example.

FIG. 15 is a diagram showing an example of a table storing energization angles and cosine values and sine values that correspond to their respective energization angles. As shown in FIG. 15, energization angles $\theta_M[i]$ corresponding to parameter i, and the cosine values and the sine values at their respective energization angles $\theta_M[i]$ are stored in the form of a table in advance in the memory. In FIG. 15, the cosine values each are denoted by A1[i] while the sine values each are denoted by A2[i]. Parameter i shows the sequential order in which a pulse voltage is applied.

As shown in FIG. 15, it should be noted that energization angle $\theta_M$ does not necessarily have to be changed so as to gradually increase or gradually decrease. Specifically in the case of FIG. 15, a pulse voltage is first applied to stator winding 31 at energization angle $\theta_M=0°$, and thereafter, a pulse voltage is applied to stator winding 31 at energization angle $\theta_M=180°$. Then, a pulse voltage is applied to stator winding 31 at energization angle $\theta_M=30°$. The reason why the energization angle is changed by 180° or by an angle closer to 180° is for the purpose of preventing a torque from being applied to the rotor in the same direction, that is, for the purpose of preventing the rotor from rotating.

Again referring to FIG. 14, in the next step S110, initial position estimation unit 57 increments parameter i showing the number of energization times by one. Furthermore, initial position estimation unit 57 sets parameter j showing the energization time period at an initial value 0.

In the next step S111, from the table, coordinate transformation unit 53 reads energization angle $\theta_M[i]$ corresponding to parameter i, and cosine value A1[i] and sine value A2[i] at this energization angle $\theta_M[i]$. Coordinate transformation unit 53 calculates U-phase voltage command value Vu*, V-phase voltage command value Vv*, and W-phase voltage command value Vw* based on cosine value A1[i] and sine value A2[i] that have been read and γ-axis voltage command value Vγ* that has been set in advance. Furthermore, based on the above-mentioned voltage command values Vu*, Vv*, and Vw*, PWM conversion unit 54 generates inverter drive signals U+, U−, V+, V−, W+, and W−, each of which is a PWM signal.

In the next step S112, based on inverter drive signals U+, U−, V+, V−, W+, and W−, drive circuit 40 starts application of the pulse-width-modulated U-phase voltage $U_M$, V-phase voltage $V_M$, and W-phase voltage M to each phase of stator winding 31 of brushless DC motor 30 (energization ON).

The time period of energization to stator winding 31 is controlled by parameter j. Specifically, while incrementing parameter j showing the pulse number of the PWM pulse (step S113), PWM conversion unit 54 continues to output inverter drive signals U+, U−, V+, V−, W+, and W− until parameter j reaches m that is an upper limit value.

When parameter j reaches m that is an upper limit value (that is, YES in step S114), then in the next step S115, U-phase current detection circuit 43U and V-phase current detection circuit 43V in FIG. 1 detect U-phase current Iu and V-phase current Iv, respectively. Furthermore, initial position estimation unit 57 sets γ-axis voltage command value Vγ* at zero, thereby setting each of U-phase voltage $U_M$, V-phase voltage $V_M$, and W-phase voltage $W_M$ that are output from drive circuit 40 at zero (energization OFF). As described above. U-phase current Iu and V-phase current Iv that are measured simultaneously with or immediately before turning-off of energization correspond to the peak values in the energization time period.

Then, in the next step S116, coordinate transformation unit 55 calculates W-phase current Iw based on U-phase current Iu and V-phase current Iv according to Iw=−Iu−Iv. This W-phase current Iw corresponds to the peak value in the energization time period. Based on energization angle $θ_M[i]$ and cosine value A1[i] and sine value A2[i] corresponding to this energization angle $θ_M[i]$, each of which is selected in step S111, coordinate transformation unit 55 calculates γ-axis current Iγ and δ-axis current Iδ from phase currents Iu, Iv, and Iw. These γ-axis current Iγ and δ-axis current IS correspond to the peak values (Iγp, Iδp) in the energization time period.

In the next step S117, initial position estimation unit 57 multiplies the peak value of γ-axis current Iγ by a cosine function value $A_1[i]$ of the present energization angle θ[i], and adds the multiplication result to integrated value S1. Furthermore, initial position estimation unit 57 multiplies the peak value of γ-axis current Iγ by a sine function value A2[i] of energization angle $θ_M[i]$, and adds the multiplication result to integrated value S2.

Up to this point, detection of the peak value of γ-axis current Iγ corresponding to the present parameter i (and accordingly, corresponding to the present energization angle $θ_M[i]$) and updates of integrated values S1 and S2 based on the detection result are completed. When parameter i has not reached the number of energization times n (NO in step S118), the process is returned to step S110 and the process in the above-mentioned steps S110 to S117 is repeated.

When parameter i has reached the number of energization times n, that is, when detection of the peak value of γ-axis current Iγ and updates of integrated values S1 and S2 based on the detection result are completed for all of energization angles $θ_M[i]$ (YES in step S118), initial position estimation unit 57 calculates the inverse tangent of the ratio between integrated values S1 and S2 according to the above-mentioned equation (9), thereby calculating phase angle $φ_1$ (step S120). Then in the next step S140, initial position estimation unit 57 sets $φ_1$ as the estimated initial position of the magnetic pole of the rotor. Up to this point, the process of estimating the initial position ends.

[Effect in First Embodiment]

According to the motor control device in the first embodiment as described above, when the initial position of the magnetic pole of the rotor is estimated by an inductive sensing scheme, the peak value of the γ-axis current is detected at each energization angle. Then, the phase angle of the trigonometric function curve is calculated assuming that the change of the peak value of the γ-axis current with respect to the energization angle is approximated by the trigonometric function curve having the same cycle as one electrical cycle of the motor. The initial magnetic pole position of the rotor is estimated based on the value of this phase angle. The initial magnetic pole position of the rotor corresponds to the electrical angle at which the approximate curve has a maximum value.

The specific method of calculating the above-described phase angle is as follows. First, the product of the peak value of the γ-axis current and the cosine value of the energization angle is calculated at each energization angle, and then, the total sum of the values of the products obtained at respective energization angles is calculated as a first integrated value. Then, the product of the peak value of the γ-axis current and the integrated value of the energization angle is calculated at each energization angle, and then, the total sum of the values of the products obtained at respective energization angles is calculated as a second integrated value. The inverse tangent of the ratio between the first integrated value and the second integrated value corresponds to the above-mentioned phase angle.

According to the above-mentioned method of estimating the initial position of the magnetic pole of the rotor, the initial position of the magnetic pole of the rotor can be accurately estimated even if the magnitude of the voltage to be applied and the length of the voltage application time period at each energization angle are limited so as to prevent the rotor from rotating. Furthermore, since the voltage application time period at each energization angle can be shortened, the time period required for estimating the initial position can be shortened.

[Modification]

Although the three-phase brushless DC motor has been described by way of example in the above, any AC motor that is driven with the voltages in two or more phases allows estimation of the initial position of the magnetic pole of the rotor in a similar procedure. Specifically, the peak values of the currents in a plurality of phases are subjected to variable transformation at energization angles, and thereby divided into: the first current component (corresponding to the above-mentioned γ-axis current) having the same electrical angle as that of the energization angle; and the second current component (corresponding to the above-mentioned δ-axis current component) that is different in electrical angle by 90 degrees from the energization angle. By using the obtained first current component, the initial position of the magnetic pole of the rotor can be estimated in the same procedure as described above.

Also, according to the above description, one electrical cycle of the motor is divided equally by 30°. Then, using the peak value of the γ-axis current obtained at each of 12 energization angles, the initial position of the magnetic pole of the rotor is estimated. Theoretically, once the direction of the torque applied to the rotor is determined, the motor can be at least started up. Accordingly, the motor can be started if there is information about the peak value of the γ-axis current obtained at at least two different energization angles of one electrical cycle of the motor.

The following is an explanation describing by which degree the energization angle should be set in one cycle of the electrical angle, from the viewpoint of an estimation error of the initial magnetic pole position caused by a folding distortion.

Figure 16:
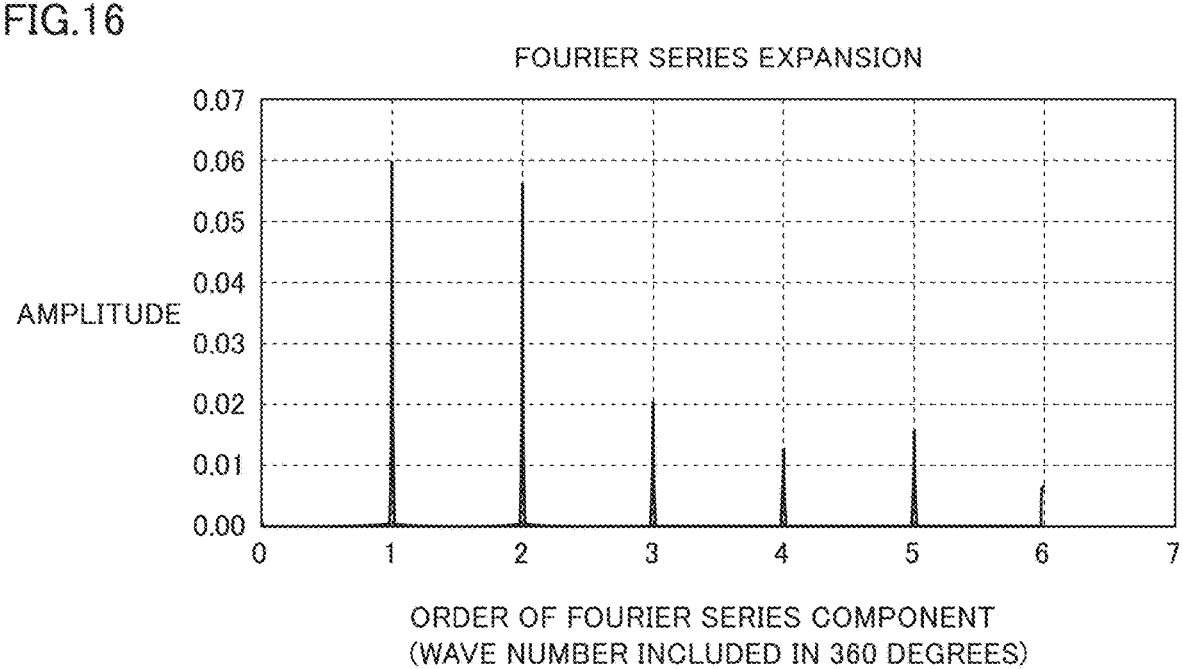
FIG. 16 is a diagram showing a result of Fourier series expansion of a waveform of the peak value of the γ-axis current shown in FIG. 10A.

FIG. 16 is a diagram showing a result of Fourier series expansion of the waveform of the peak value of the γ-axis current shown in FIG. 10A. The horizontal axis in FIG. 16 shows the order of the Fourier series component, that is, the wave number included in 360°. Specifically, the wave number of the first-order component having a cycle of 360° is 1, and the wave number of the second-order component having a cycle of 180° is 2. The wave number of the N-order component having a cycle of 360°/N is N. The vertical axis in FIG. 16 shows the amplitude value of each component.

When one electrical cycle of the brushless DC motor is divided equally into L segments and sampled L times (that is, in the case of L energization angles), the component having the wave number larger than L/2 is folded and overlapped with the component having the wave number smaller than L/2 according to the sampling theorem. Thus, the first-order component used for estimating the magnetic pole position of the rotor (that is, the component having a cycle of 360°) is overlapped with the (L−1)-order component having a cycle of 360°/(L−1). Thus, in order to prevent the waveform of the first-order component from being influenced by the folding distortion, it is necessary to limit a ratio R of the amplitude of the (L−1)-order folding component with respect to the amplitude of the first-order component.

Figure 17:
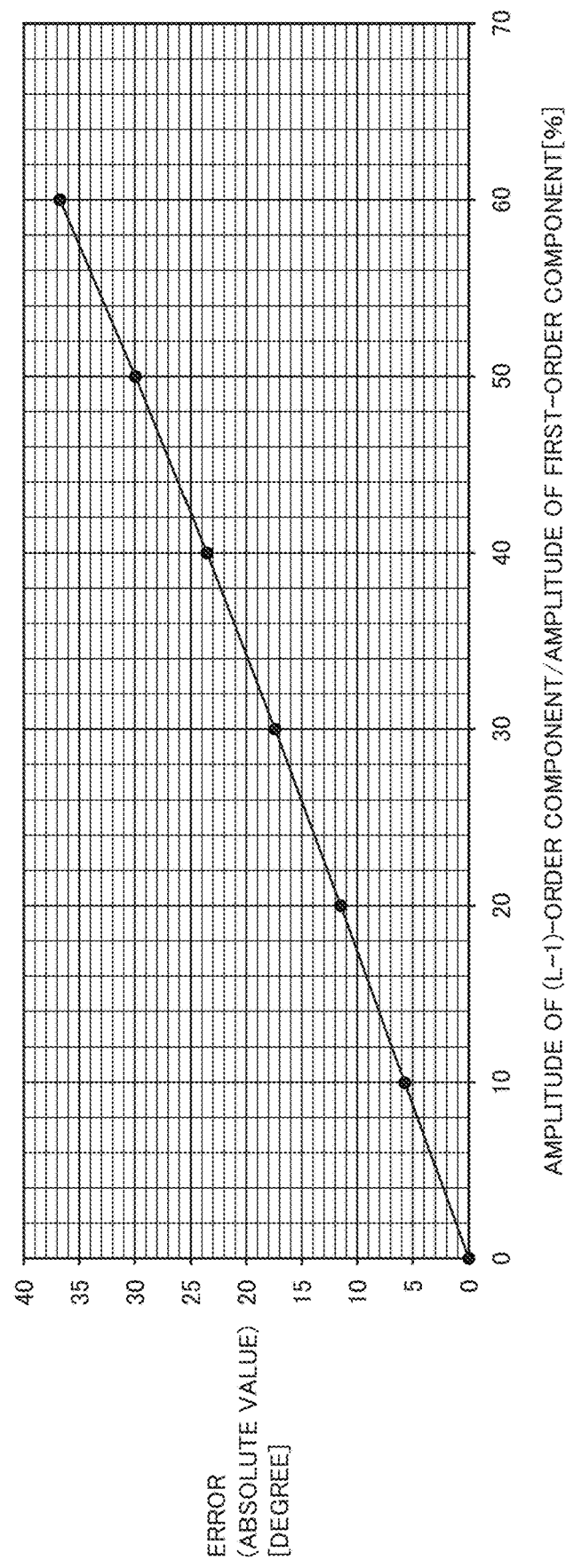
FIG. 17 is a diagram showing the relation between: a ratio of an amplitude of the (L−1)-order component with respect to an amplitude of the first-order component; and an absolute value of an error of an initial magnetic pole position.

FIG. 17 is a diagram showing the relation between the ratio of the amplitude of the (L−1)-order component with respect to the amplitude of the first-order component and an absolute value of an error of the initial magnetic pole position.

As shown in FIG. 17, there is an approximately proportional relation between: a ratio R[%] of the amplitude of the (L−1)-order component with respect to the amplitude of the first-order component; and an absolute value $\theta_A$ [degree] of the angle error of the estimated initial position that results from a folding distortion. Specifically, by using absolute value $\theta_A$ [degree] of the angle error, the above-mentioned ratio R[%] is generally represented by $\theta_A \times 5/3$ (that is, approximately $1.67 \times \theta_A$). Thus, the procedure of determining a sampling number L in one cycle of the electrical angle is performed as follows.

(i) First, the relation between the energization angle and the peak value of the γ-axis current is experimentally obtained in advance. In this case, the sampling number in one cycle of the electrical angle is increased as much as possible. Then, the Fourier series component of each order is calculated based on the experiment result. (ii) Then, a maximum allowable amount $\theta_A$ [degree] of the angle error is determined based on the folding distortion included in the estimated initial position. (iii) Then, based on the Fourier series component of each order obtained in the above (i). L is determined such that the ratio [%] of the amplitude of the (L−1)-order component with respect to the amplitude of the first-order component becomes equal to or less than a value that is 1.67 times as large as $\theta_A$.

Second Embodiment

The second embodiment will be described with regard to a method of correcting an estimation result in order to further reduce the error in initial position estimation in the first embodiment. The following is also an explanation about the case where the approximate curve by a trigonometric function is set at $A_0 + A_1 \cdot \cos(\theta_M - \phi_1)$. In this case, since the trigonometric function curve exhibits a maximum value on the condition that $\theta_M = \phi_1$, phase angle $\phi_1$ can be defined as an estimated magnetic pole position without any change. As described above, it should be noted that, when the approximate curve by a trigonometric function is applied in another function form, the trigonometric function curve does not necessarily attain a maximum value on the condition that $\theta_M = \phi_1$.

[As to Error in Initial Position Estimation]

Figures 18A, 18B:
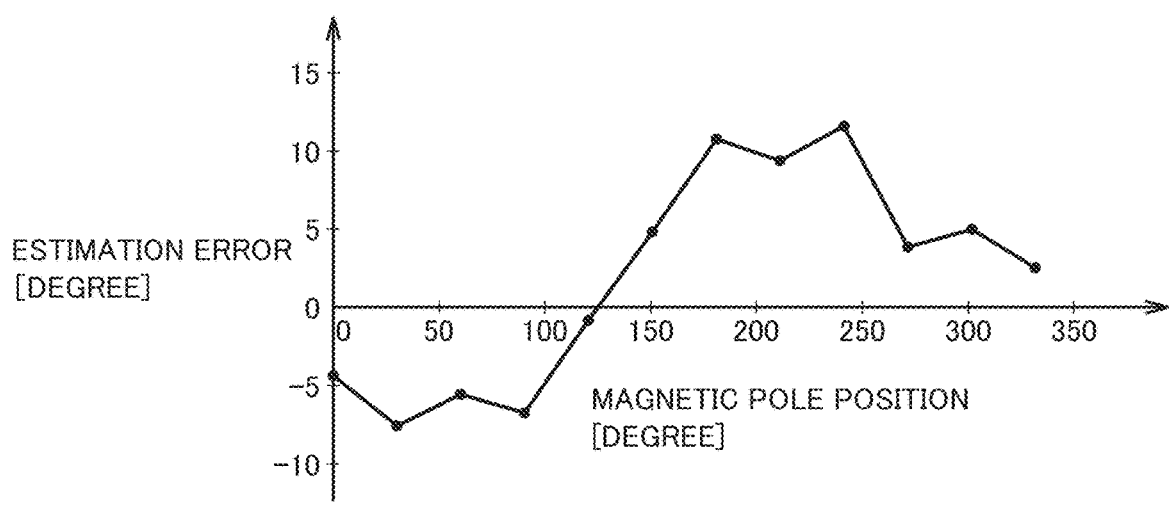
FIGS. 18A and 18B each are a diagram showing an example of a result of estimation of the magnetic pole position.

FIGS. 18A and 18B each are a diagram showing an example of a result of estimation of the magnetic pole position. FIG. 18A shows an estimation result in the form of a table while FIG. 18B shows a graph of the relation between magnetic pole position θ of the rotor and the error of the estimated initial position. The numerical values in the table shown in FIG. 18A and the graph shown in FIG. 18B are obtained in the following procedure.

First, the voltage applied to the stator winding and the energization time period for the stator winding are increased to some extent, thereby pulling the magnetic pole of the rotor to the position appropriate to the energization angle in advance. Thereby, magnetic pole position θ of the rotor is adjusted to a desired position in advance. Then, phase angle $\phi_1$ as an estimate value of the magnetic pole position of the rotor is obtained according to the estimation method described in the first embodiment. The above-described procedure is performed for magnetic pole positions θ of a plurality of rotors, to thereby calculate estimate values $\phi_1$ for the magnetic pole positions θ and each deviation therebetween (that is, $\phi_1 - \theta$). This deviation (that is, $\phi_1 - \theta$) means the error of the estimated initial position.

As shown in FIG. 18B, the error of the estimated initial position obtained in this way changes in the manner close to the trigonometric function having a cycle of approximately 360° with respect to magnetic pole position θ. It is known that such a tendency of the error of the estimated initial position basically varies among motors, but the motors having the same model number and manufactured based on the same design have approximately the same error tendency. Thus, the error of the estimated initial position results from the structure or the characteristics of the motor, and the motor having the same model number has reproducibility.

Thus, in the procedure as described above, estimated magnetic pole position $\phi_1$ corresponding to true magnetic pole position θ is obtained to calculate the deviation therebetween (that is, an error of the estimated magnetic pole position). Then, this result is stored as calibration data in memory in advance in the form of a table as shown in FIG. 18A. Then, when estimating the initial position of the magnetic pole, a newly obtained estimated magnetic pole position 4, is corrected using the calibration data, which allows more accurate estimation of the initial position of the magnetic pole of the rotor. In the following, the method of estimating the initial position will be specifically described with reference to the flowcharts in FIGS. 19 and 20. The configuration of the motor control device is the same as that in the first embodiment.

[Method of Estimating Initial Position of Magnetic Pole of Rotor]

Figure 19:
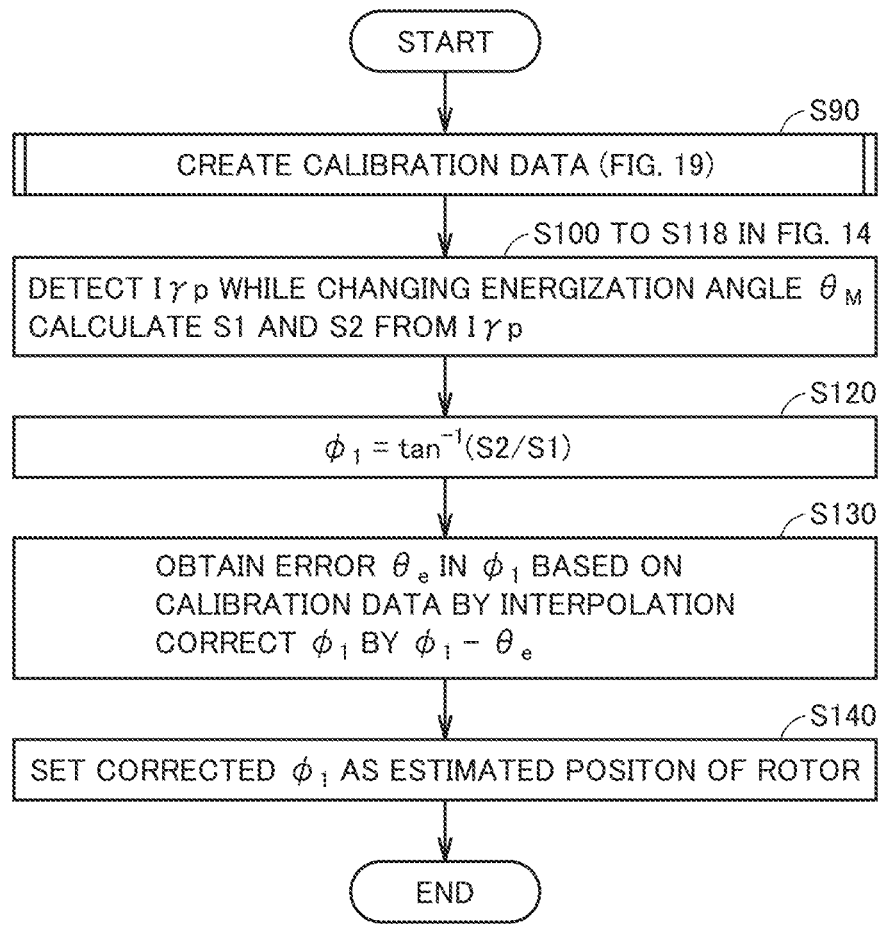
FIG. 19 is a flowchart illustrating a procedure of estimating an initial position of a magnetic pole of a rotor in a motor controlling method according to the second embodiment.

FIG. 19 is a flowchart illustrating a procedure of estimating an initial position of a magnetic pole of a rotor in a motor controlling method according to the second embodiment. In FIG. 19, the steps that are identical or correspond to those in FIG. 14 in the first embodiment will be denoted by the same reference characters.

Referring to FIGS. 5 and 19, in step S90, calibration data as shown in FIG. 18A is created and stored in the form of a table in memory in advance. Creation of the calibration data in step S90 is performed only when the motor is manufactured, after the motor is installed in an apparatus, or after the motor is replaced in the apparatus, but does not need to be performed each time the initial position of the magnetic pole of the rotor is estimated. The details of the procedure of creating calibration data will be described later with reference to FIG. 20.

Then, in the procedure shown in steps S100 to S118 in FIG. 14, initial position estimation unit 57 detects peak value Iγp of the γ-axis current while changing energization angle $\theta_M$, and then, calculates integrated values S1 and S2 using the detected peak value Iγp of the γ-axis current.

Then, as in step S120 in FIG. 14, initial position estimation unit 57 calculates the inverse tangent of the ratio between integrated values S1 and S2 according to the above-mentioned equation (9), to thereby calculate phase angle $\phi_1$ as an estimate value of the magnetic pole position.

In the next step S130, initial position estimation unit 57 calculates an error $\theta_e$ corresponding to estimate value $\phi_1$ of the magnetic pole position by interpolation using the calibration data as show in FIG. 18A. Then, initial position estimation unit 57 corrects estimate value $\phi_1$ according to $\phi_1 - \theta_e$.

In the next step S140, initial position estimation unit 57 sets the corrected estimate value $\phi_1$ as an initial position of the magnetic pole of the rotor.

Figure 20:
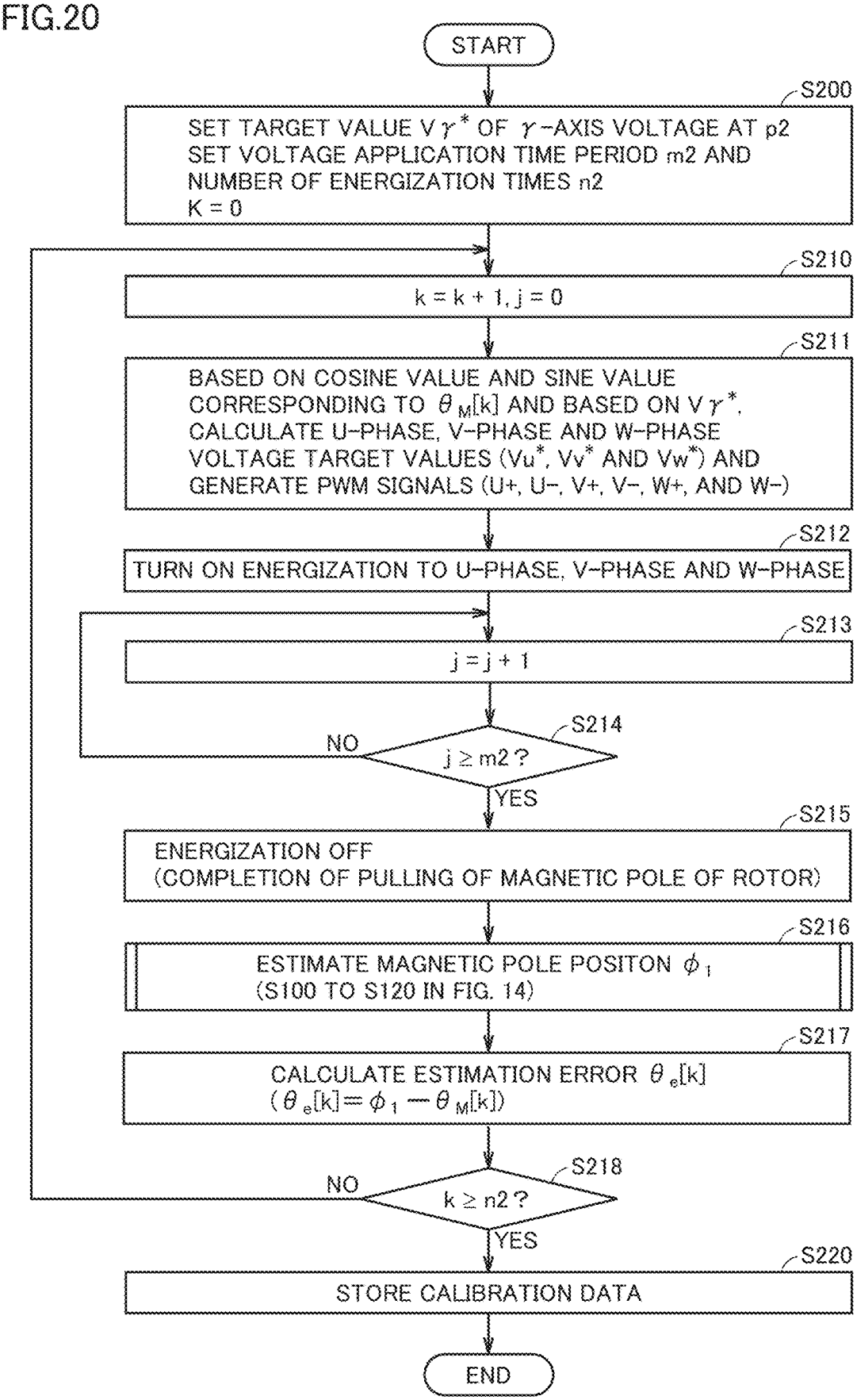
FIG. 20 is a flowchart illustrating a procedure of creating calibration data.

FIG. 20 is a flowchart illustrating a procedure of creating calibration data.

Referring to FIG. 20, in step S200, γ-axis voltage command value Vγ* is set at p2, the time period in which a voltage is applied to stator winding 31 (that is, the energization time period) at each energization angle $\theta_M$ for pulling the rotor is set, and then, a total number of energization times n2 is set. For example, when a voltage is applied to stator winding 31 at each 30 degrees for pulling the rotor, total number of energization times n is set at 12. The energization time period can be controlled by a maximum number m2 of the PWM pulse to be output.

In this case, when the rotor is to be pulled, a set value p2 of γ-axis voltage command value Vγ* is set to be smaller than a set value p in FIG. 14, and a set value m2 corresponding to the voltage application time period is set to be larger than a set value m in FIG. 14. The total energization time period at each energization angle is of the order of several hundred milliseconds to several seconds, for example.

The parameter at which the number of energization times is counted is defined as k. Parameter k is initialized to an initial value 0. The parameter showing the energization time period is defined as j. Parameter j is counted up from 0 to m2.

In this case, an energization angle $\theta_M[k]$ corresponding to the number of energization times k and the cosine value and the sine value each corresponding to energization angle $\theta[k]$ are stored, for example, in the form of a table as shown in FIG. 12 in the memory in advance. Calibration data is created such that energization angle $\theta_M$ is changed so as to gradually increase or gradually decrease in order to reduce the movement amount of the rotor to the extent possible when the rotor is pulled.

In the next step S210, initial position estimation unit 57 increments parameter k showing the number of energization times by one. Furthermore, initial position estimation unit 57 sets parameter j showing the energization time period at an initial value 0.

In the next step S211, from the table, coordinate transformation unit 53 reads energization angle $\theta_M[k]$ corresponding to parameter k, and the cosine value and the sine value at this energization angle $\theta_M[k]$. Based on the cosine value and the sine value that have been read and γ-axis voltage command value Vγ* that has been set in advance, coordinate transformation unit 53 calculates U-phase voltage command value Vu*, V-phase voltage command value Vv*, and W-phase voltage command value Vw*. Furthermore, based on the above-mentioned voltage command values Vu*, Vv*, and Vw*, PWM conversion unit 54 generates inverter drive signals U+, U−, V+, V−, W+, and W−, each of which is a PWM signal.

In the next step S212, based on inverter drive signals U+, U−, V+, V−, W+, and W−, drive circuit 40 starts application of the pulse-width modulated U-phase voltage $U_M$, V-phase voltage $V_M$, and W-phase voltage $W_M$ to each phase of stator winding 31 of brushless DC motor 30 (energization ON).

The energization time period for stator winding 31 is controlled by parameter j. Specifically, while incrementing parameter j showing the pulse number of the PWM pulse (step S213), PWM conversion unit 54 continues to output inverter drive signals U+, U−, V+, V−, W+, and W− until parameter j reaches m2 as an upper limit value.

When parameter j reaches m2 as an upper limit value (that is, YES in step S214), then in the next step S215, initial position estimation unit 57 sets γ-axis voltage command value Vγ* at zero, thereby setting U-phase voltage $U_M$, V-phase voltage $V_M$, and W-phase voltage $W_M$ that are output from drive circuit 40 at zero (energization OFF). Thus, magnetic pole position θ of the rotor becomes equal to energization angle $\theta_M$.

In the next step S216, initial position estimation unit 57 obtains phase angle $\phi_1$ as an estimate value of the magnetic pole position of the rotor in the same procedure as that in steps S100 to S120 in FIG. 14.

In the next step S217, initial position estimation unit 57 calculates an error $\theta_e[k]$ of estimated magnetic pole position $\phi_1$ with respect to a true magnetic pole position θ. Since magnetic pole position θ is equal to energization angle $\theta_M[k]$, error $\theta_e[k]$ of the estimated initial position can be calculated by $\phi_1 - \theta_M[k]$.

As above, calculation of error $\theta_e[k]$ of the estimated initial position at magnetic pole position θ of the rotor corresponding to the present parameter k (that is, equal to energization angle $\theta_M[k]$) is completed. When parameter k does not reach the number of energization times n2 (NO in step S218), the process returns to step S210, and then, the process in the above-mentioned steps S210 to S217 is repeated.

When parameter k reaches the number of energization times n, that is, when calculation of error $\theta_e[k]$ of the estimated initial position for each energization angle $\theta_M[k]$ is completed (YES in step S218), initial position estimation unit 57 stores, in memory, the calibration data showing the relation between estimate value $\phi_1$ of the magnetic pole position of the rotor and its error $\theta_e$. As above, the process of creating calibration data ends.

[Effect in Second Embodiment]

According to the motor control device in the second embodiment, the error of the estimate value of the magnetic pole position (that is, the deviation between true magnetic pole position θ and estimated magnetic pole position $\phi_1$) is detected in advance for each motor. Then, the initial position of the magnetic pole newly estimated according to the procedure shown in the first embodiment is corrected using the error of the estimate value of the initial position detected in advance, with the result that the estimation accuracy can be further improved.

[Modification]

In the above description, calibration data is created in the form of a table, to specify error $\theta_e$ corresponding to phase angle $\phi_1$ as a newly detected estimated magnetic pole position by interpolation using the calibration data. In contrast, the polynomial approximation equation showing the relation between estimate value $\phi_1$ of the magnetic pole position corresponding to already-known magnetic pole position $\theta$ and error $\theta_e$, thereof may be derived in advance, or the polynomial approximation equation showing the relation between estimate value $\phi_1$ of the magnetic pole position corresponding to already-known magnetic pole position $\theta$ and corrected estimate value $\phi_1$ may be derived in advance. In this case, for estimate value $\phi_1$ of the magnetic pole position newly detected with respect to unknown magnetic pole position $\theta$, corresponding error $\theta_e$ or corrected estimated magnetic pole position $\phi_1$ may be determined using the derived polynomial approximation equation.

Third Embodiment

The third embodiment will be described with regard to an example in which the motor control device described in each of the first and second embodiments is used for controlling each of motors for driving a paper feed roller, a timing roller, a conveyance roller and the like in an image forming apparatus, which will be hereinafter described with reference to the accompanying drawings.

[Configuration Example of Image Forming Apparatus]

Figure 21:
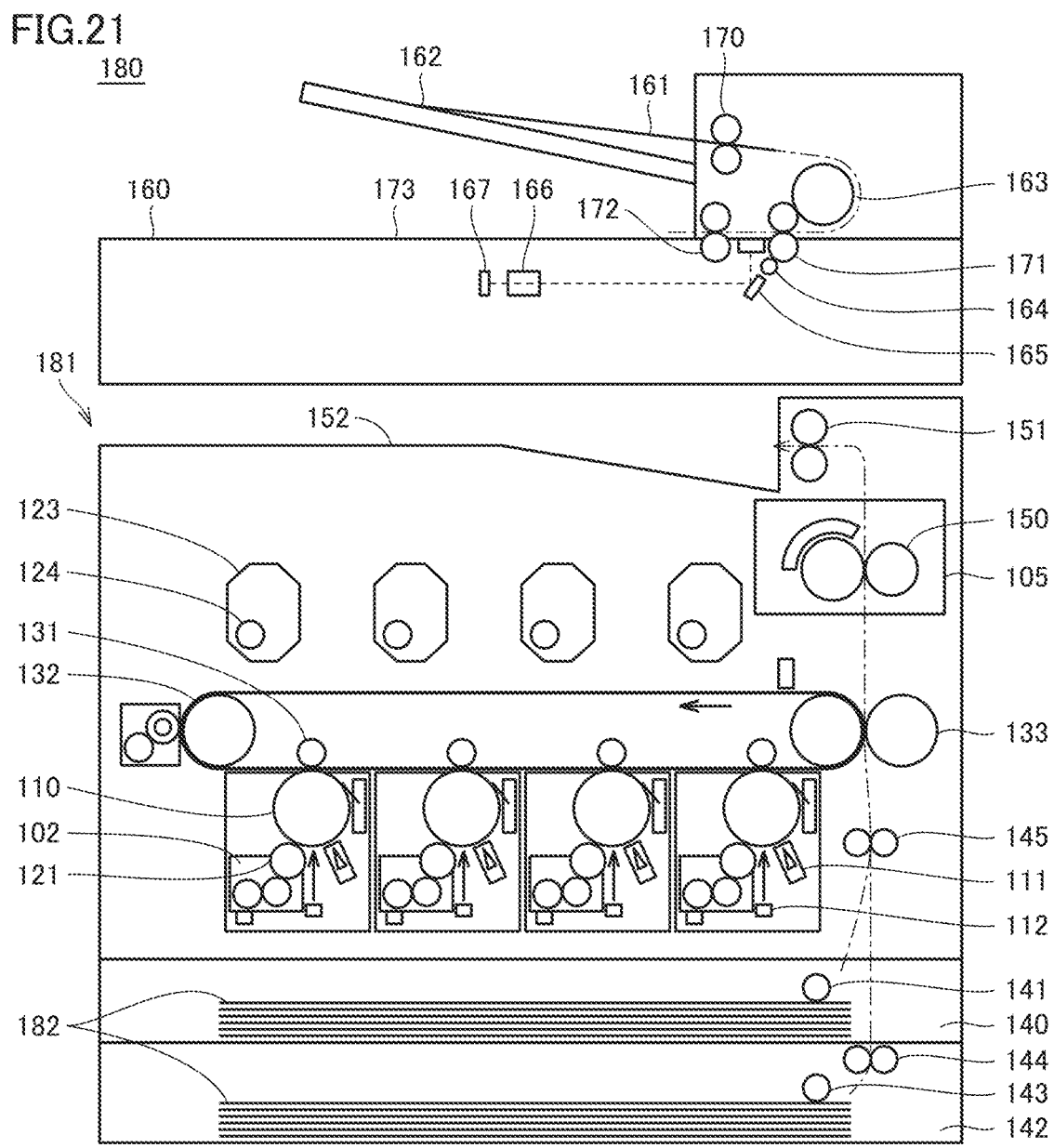
FIG. 21 is a cross-sectional view showing an example of the configuration of an image forming apparatus.

FIG. 21 is a cross-sectional view showing an example of the configuration of an image forming apparatus. It should be noted that the cross-sectional view in FIG. 21 is merely schematically shown and may be partially enlarged or modified in aspect ratio in order to simplify the illustration.

Referring to FIG. 21, an image forming apparatus 180 includes an imaging unit 181 configured as a tandem color printer, a paper feed mechanism 182, and a document reading device 160. Image forming apparatus 180 may be configured as a multifunctional peripheral (MFP) connected to a network and having functions as a printer, a scanner, a copy machine, a facsimile machine, and the like.

Imaging unit 181 includes four photoreceptor cartridges 191, 192, 193, 194, a primary transfer roller 131, a transfer belt 132, a toner bottle 123, a secondary transfer roller 133, and a fixing device 105.

Photoreceptor cartridges 191, 192, 193, 194 form toner images of four colors including yellow (Y), magenta (M), cyan (C), and black (K), respectively. Each of photoreceptor cartridges 191, 192, 193, 194 includes a cylindrical photoreceptor 110, a charging unit Ill, an image exposure device 112 including a light source, and a developing device 102 including a developing roller 121.

Charging unit 11 uniformly charges the surface of photoreceptor 110 at a prescribed potential. Image exposure device 112 causes the image corresponding to a document image to be exposed to the charged region of photoreceptor 110. Thereby, an electrostatic latent image is formed on photoreceptor 110. Using developing roller 121 to which developing bias is applied, developing device 102 causes toner to adhere to the electrostatic latent image, thereby forming a visible toner image.

Also, four toner bottles 123 are provided corresponding to their respective photoreceptor cartridges 191, 192, 193, and 194. Toner is supplied from toner bottles 123 to their respective photoreceptor cartridges. A stirring fin 124 for stirring toner is provided inside each of toner bottles 123.

Four primary transfer rollers 131 are provided so as to face their respective four photoreceptors 110. Each of photoreceptors 110 and a corresponding one of primary transfer rollers 131 are pressed against each other with transfer belt 132 interposed therebetween. Furthermore, a bias for attracting toner is applied to each primary transfer roller 131. Thereby, the visible toner image on the surface of photoreceptor 110 after development is transferred onto transfer belt 132.

The visible toner image transferred onto transfer belt 132 is conveyed to the position of secondary transfer roller 133. A transfer voltage is also applied to secondary transfer roller 133 in the same manner as with the primary transfer roller. Thereby, the visible toner image conveyed by transfer belt 132 is transferred onto a sheet of paper as a recording medium 183 at a nip portion between secondary transfer roller 133 and transfer belt 132.

The visible toner image transferred onto recording medium 183 is conveyed to fixing device 105. Fixing device 105 has a fixing roller 150 and uses this fixing roller 150 to heat and pressurize recording medium 183, thereby fixing the visible toner image on recording medium 183. Recording medium 183 after fixation is discharged by a paper discharge roller 151 onto a paper discharge tray 152.

Paper feed mechanism 182 takes in a sheet of paper as recording medium 183 from paper feed cassettes 140 and 142, and then conveys the sheet of paper to secondary transfer roller 133. Paper feed mechanism 182 includes paper feed cassettes 140, 142, paper feed rollers 141, 143, a conveyance roller 144, and a timing roller 145.

Recording media 183 housed in paper feed cassette 140 in the first stage are taken out one by one by paper feed roller 141 and conveyed to timing roller 145. Recording media 183 housed in paper feed cassette 142 in the second stage are taken out one by one by paper feed roller 143 and conveyed through conveyance roller 144 to timing roller 145.

Timing roller 145 stops the supplied recording medium 183, thereby adjusting: the timing at which the visible toner image transferred onto transfer belt 132 is conveyed to secondary transfer roller 133; and the timing at which recording medium 183 is supplied to secondary transfer roller 133.

Document reading device 160 reads the document image on a document sheet 161, to thereby generate image data. In the example shown in FIG. 21, document reading device 160 is provided above imaging unit 181. Document reading device 160 includes a document platen 162, a paper feed roller 170, document conveyance rollers 163, 171, a document discharge roller 172, a paper discharge tray 173, a light source 164, a mirror 165, a lens 166, and an image sensor 167 such as a charged-coupled device (CCD).

Document sheets 161 placed on document platen 162 are taken in one by one by paper feed roller 170. Document sheet 161 is conveyed by document conveyance rollers 163 and 171, and thereby, reaches a document reading position.

At the document reading position, light source 164 applies light upon the document image on document sheet 161. The light reflected on the surface of document sheet 161 is reflected by mirror 165, and thereafter, condensed by lens 166 so as to be incident upon image sensor 167. As a result, the document image on document sheet 161 is formed as an image on the sensor surface of image sensor 167, and the image data of the document image is produced by image sensor 167.

Document sheet 161 having passed through the document reading position is discharged by document discharge roller 172 onto paper discharge tray 173.

[Application of Brushless DC Motor to Driving Source of Roller]

In image forming apparatus 180 configured as described above, various types of rollers have been driven conventionally using stepping motors in many cases, but brushless DC motors are currently used in many cases. This is because there are problems that a stepping motor is larger in noise, greater in power consumption and lower in efficiency than a brushless DC motor.

However, for closed loop control, a normal brushless DC motor is provided with a Hall element or an encoder for detecting the rotation position of the rotor. Extra costs required for providing such a sensor also cause a new problem that the normal brushless DC motor is higher in cost than the stepping motor that allows open loop control. It is strongly desired to use a sensorless-type brushless DC motor in order to solve the above-described problems.

In this case, the sensorless-type brushless DC motor requires estimation of the initial position of the magnetic pole of the rotor when the motor in the stopped state is started. As a method of estimating the initial position, generally, the stator is energized at a prescribed energization angle, and the magnetic pole of the rotor is attracted to the position corresponding to the energization angle, and thereafter, rotation of the motor is started.

However, in the case of image forming apparatus 180, the above-described method of pulling the rotor cannot be used particularly for the motors for driving paper feed rollers 141, 143 and 170 and timing roller 145, for the following reason. Specifically, in the case of paper feed rollers 141, 143, and 170, a sheet of paper is held by a roller nip. In the case of timing roller 145, the tip of a sheet of paper comes into contact with the inlet of the roller nip. Thus, by pulling the rotor, the roller is rotated to thereby cause a sheet of paper as recording medium 183 to be also moved together, which may cause a paper jam in the case of paper feed rollers 141, 143 and 170, and also, which may lead to difficulty in achieving accurate timing control in the case of timing roller 145.

For the reasons as described above, the initial position of the magnetic pole of the rotor is estimated by an inductive sensing scheme in which the stator winding is applied with a voltage enough to prevent the rotor from rotating, as already described above. In this initial position estimation, the motor control device and the motor controlling method described in the first and second embodiments are applicable in order to estimate the initial position with accuracy and in a short time period.

[Details of Method of Controlling Roller]

Figure 22:
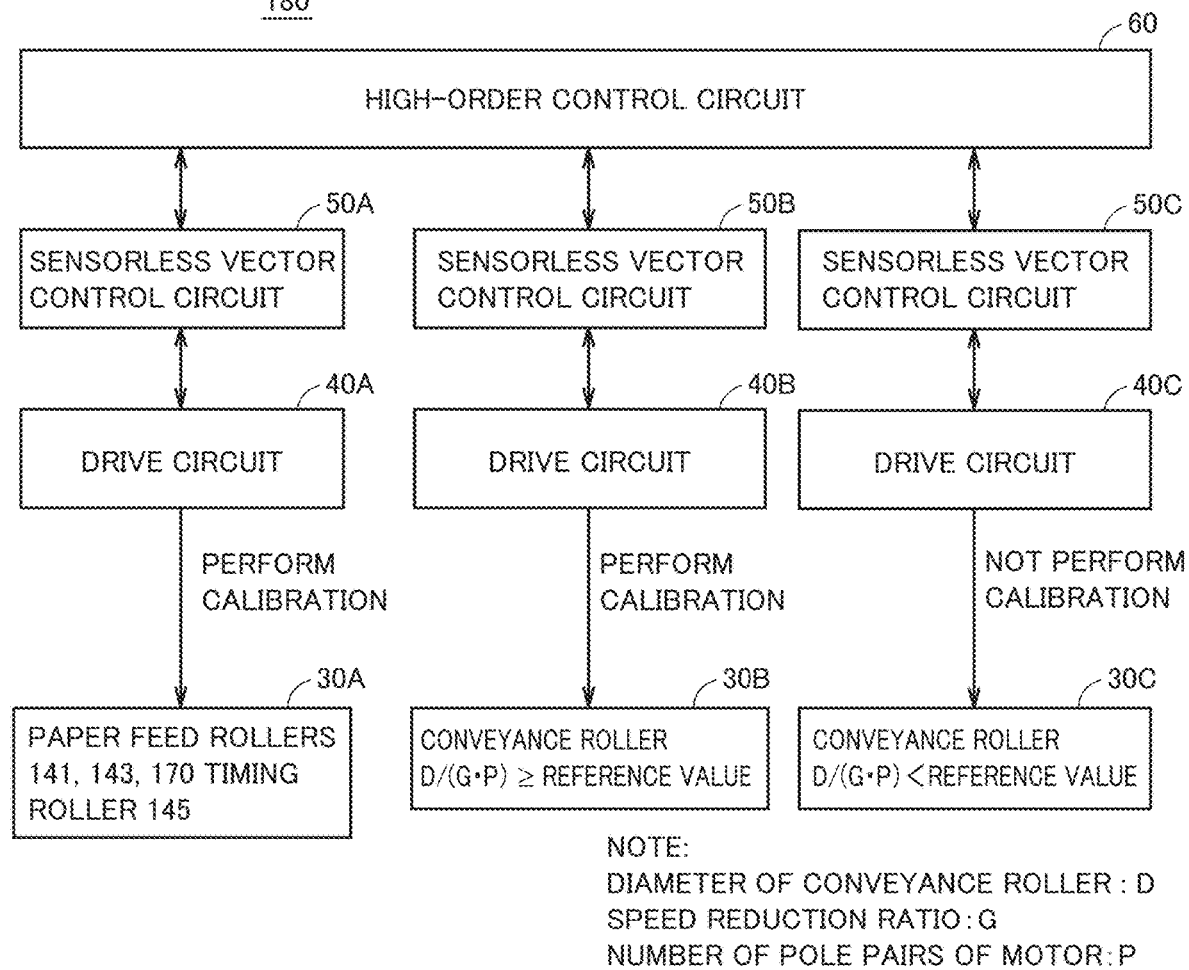
FIG. 22 is a block diagram showing the configuration of a motor used for controlling driving of each of rollers: and its control device, in the image forming apparatus in FIG. 21.

FIG. 22 is a block diagram showing the configuration of: a motor used for controlling driving of each of rollers; and its control device, in the image forming apparatus in FIG. 21.

FIG. 22 shows image forming apparatus 180 representatively including: a brushless DC motor 30A for driving one of paper feed rollers 141, 143, 170, and tinting roller 145; and brushless DC motors 30B and 30C for driving conveyance rollers. Furthermore, drive circuits 40A, 40B, and 40C are provided corresponding to brushless DC motors 30A, 30B, and 30C, respectively. Also, sensorless vector control circuits 50A, 50B, and 50C are provided corresponding to brushless DC motors 30A, 30B, and 30C, respectively. Furthermore, image forming apparatus 180 includes a high-order control circuit 60 for controlling sensorless vector control circuits 50A, 50B, and 50C.

In this case, it is desirable that sensorless vector control circuit 50A for controlling brushless DC motor 30A for driving one of paper feed rollers 141, 143, 170 and timing roller 145 serves to correct phase angle $\phi_1$ as an estimate value of the initial position of the magnetic pole of the rotor by using the calibration data, as described in the second embodiment. Thereby, the initial position of the magnetic pole of the rotor can be more accurately estimated.

For brushless DC motors 30B and 30C for driving the conveyance rollers, it is not necessary to create calibration data and correct phase angle $\phi_1$ as an estimated magnetic pole position based on the calibration data. However, depending on the configurations of the roller and the motor, some of the conveyance rollers may be desirably calibrated for suppressing errors.

Specifically, focusing attention on a diameter D of the conveyance roller, a speed reduction ratio G from the motor to the conveyance roller, and the number of pole pairs P of the motor, it may be determined based on comparison between at least one of these values and a reference value whether calibration should be performed or not. As diameter D of the conveyance roller becomes larger, errors become more significant. Thus, it is desirable to perform a calibration. As speed reduction ratio G from the motor to the conveyance roller becomes smaller, errors become more significant. Thus, it is desirable to perform a calibration. As the number of pole pairs P of the motor becomes smaller, errors become more significant. Thus, it is desirable to perform a calibration.

Alternatively, when a determination value D/(G·P) is calculated based on the above-mentioned parameters D, P, and G and this determination value is equal to or greater than the reference value (that is, in the case of brushless DC motor 30B in FIG. 22), a calibration may be performed. In contrast, when this determination value is less than the reference value (that is, in the case of brushless DC motor 30B in FIG. 22), sensorless vector control circuit 50C does not perform a calibration.

Figure 23:
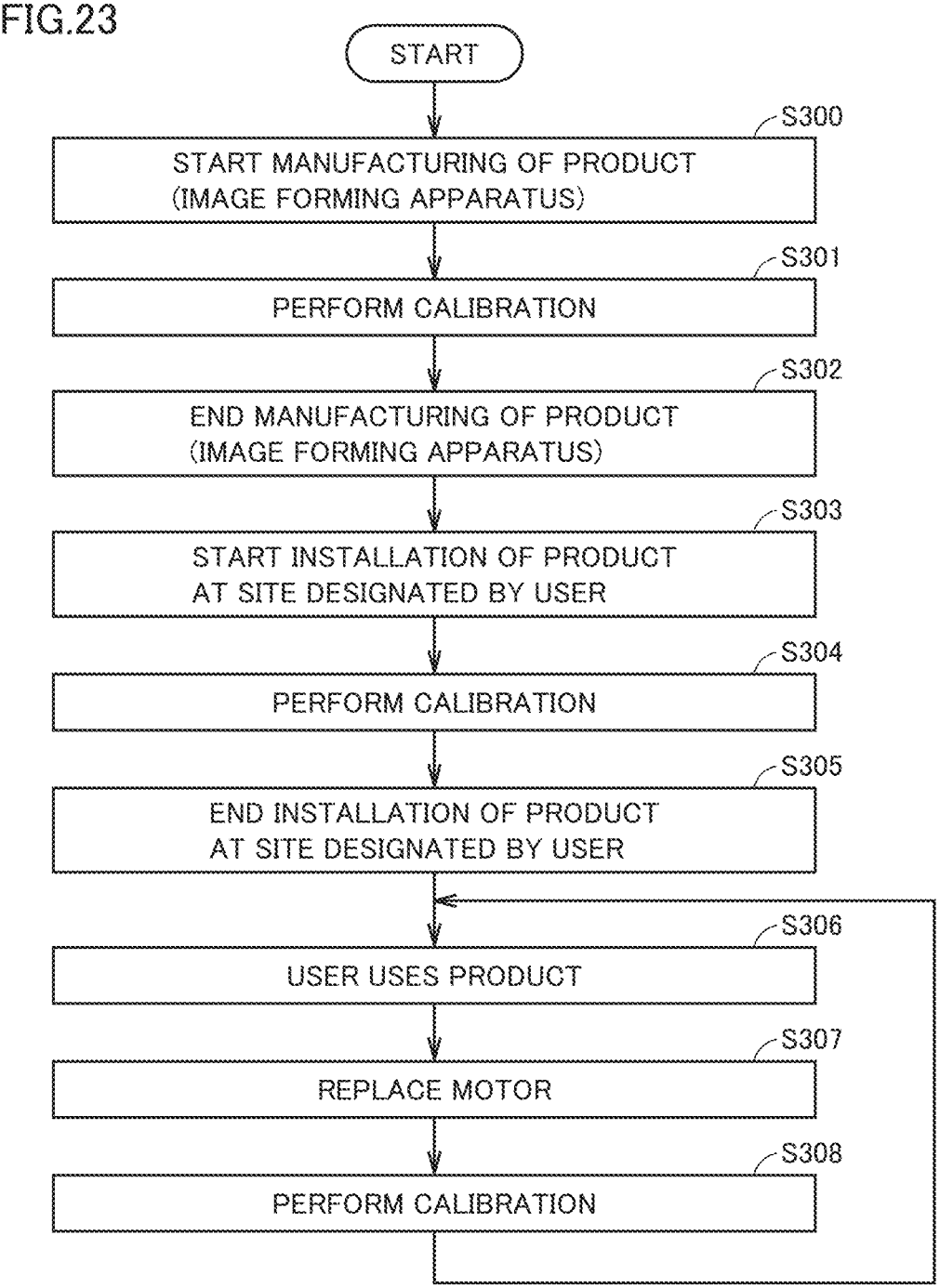
FIG. 23 is a flowchart for illustrating the timing of creating calibration data.

FIG. 23 is a flowchart for illustrating the timing of creating calibration data.

Referring to FIG. 23, it is desirable to create calibration data (S301) in a time period from the start of manufacturing of a product (an image forming apparatus) (S300) to the end of manufacturing of the product (S302). Furthermore, it is desirable to create calibration data (S304) in a time period after the start of installation of the product at a site designated by a user (a user site) (S303) until the ends of the installation (S305). Furthermore, it is desirable that the user starts using the product (S306), then the motor is replaced (S307), and thereafter, calibration data is created (S308).

Figure 24:
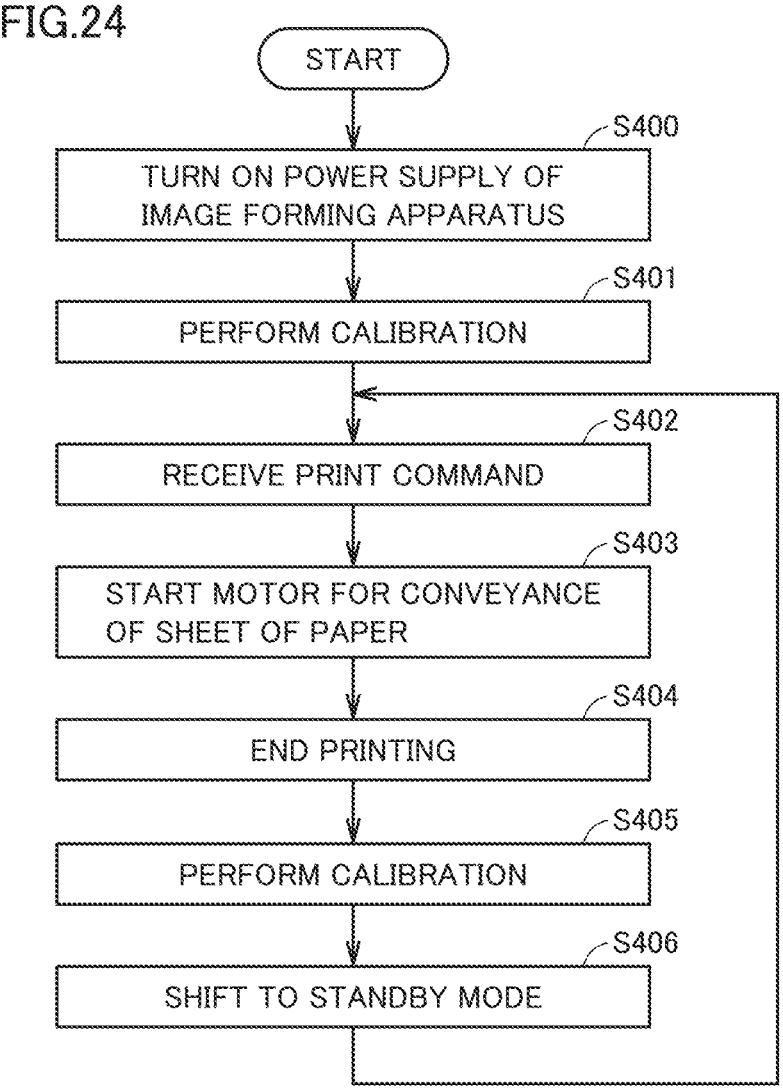

FIG. 24 is a flowchart for illustrating the timing of creating calibration data after a power supply of the image forming apparatus is turned on.

Referring to FIG. 24, after the power supply of the image forming apparatus is turned on (S400), sensorless vector control circuit 50 creates calibration data (S401) until it starts the brushless DC motor for conveying sheets of paper.

Then, sensorless vector control circuit 50 receives a print command from high-order control circuit 60 (S402), and starts the brushless DC motor for conveying the sheets of paper (S403). When printing ends (S404) and a prescribed waiting time has elapsed, high-order control circuit 60 turns off the elements other than a standby power supply to shift to a standby mode (S406). Immediately before shifting to a standby mode, sensorless vector control circuit 50 creates calibration data (S405). This leads to an advantage that a brushless DC motor can be immediately started without having to create calibration data when the standby mode is canceled in response to a print command from high-order control circuit 60.

Although embodiments of the present invention have been described and illustrated in detail, the disclosed embodiments are made for purposes of illustration and example only and not limitation. The scope of the present invention should be interpreted by terms of the appended claims.

What is claimed is:

1. A motor control device that controls a motor of a sensorless type, the motor control device comprising:
   a drive circuit that applies a voltage to each of a plurality of phases of a stator winding of the motor; and
   a controller that controls the drive circuit, wherein
   when the controller estimates an initial magnetic pole position of a rotor of the motor in an inductive sensing scheme, the controller:
   (i) causes the drive circuit to continuously or intermittently apply a voltage to the stator winding at each of a plurality of energization angles while sequentially changing the energization angles, and at a voltage value and for an energization time period, the voltage value and the energization time period being set such that the rotor does not rotate;
   (ii) converts peak values of currents flowing through the phases of the stator winding into a first current component having an electrical angle that is equal to a corresponding one of the energization angles and a second current component that is different in electrical angle by 90 degrees from the first current component, each of the peak values being obtained at a corresponding one of the energization angles; and
   (iii) estimates the initial magnetic pole position of the rotor based on a phase angle of a trigonometric function curve, the phase angle being obtained when a variation of the first current component with respect to each of the energization angles is approximated by the trigonometric function curve, and
   the trigonometric function curve has a cycle equal to one electrical cycle of the motor.

2. The motor control device according to claim 1, wherein the estimated initial magnetic pole position corresponds to an energization angle at which the trigonometric function curve has a maximum value.

3. The motor control device according to claim 1, wherein estimating the initial magnetic pole position of the rotor based on the phase angle of the trigonometric function curve includes:
   at each of the energization angles, multiplying a value of the first current component by a cosine value of the energization angle, obtaining a total sum of multiplication results obtained for the energization angles, and thereby calculating a first integrated value;
   at each of the energization angles, multiplying the value of the first current component by a sine value of the energization angle, obtaining a total sum of multiplication results obtained for the energization angles, and thereby calculating a second integrated value; and
   calculating the phase angle based on a ratio between the first integrated value and the second integrated value.

4. The motor control device according to claim 3, wherein calculating the phase angle includes calculating a phase angle based on an inverse tangent of the ratio between the first integrated value and the second integrated value.

5. A method of estimating an initial position of a magnetic pole of a rotor of a motor that is of a sensorless type, the method comprising:
   continuously or intermittently applying a voltage to each of a plurality of phases of a stator winding at each of a plurality of energization angles while sequentially changing the energization angles, and at a voltage value and for an energization time period, the voltage value and the energization time period being set such that the rotor does not rotate;
   at each of the energization angles, converting peak values of currents flowing through the phases of the stator winding into a first current component having an electrical angle that is equal to a corresponding one of the energization angles and a second current component that is different in electrical angle by 90 degrees from the first current component; and
   estimating the initial position of the magnetic pole of the rotor based on a phase angle of a trigonometric function curve, the phase angle being obtained when a variation of the first current component with respect to each of the energization angles is approximated by the trigonometric function curve, wherein
   the trigonometric function curve has a cycle equal to one electrical cycle of the motor.

6. The method of estimating an initial position of a magnetic pole of a rotor according to claim 5, wherein the estimated initial position of the magnetic pole corresponds to an energization angle at which the trigonometric function curve has a maximum value.

7. The method of estimating an initial position of a magnetic pole of a rotor according to claim 5, wherein
   the estimating the initial position of the magnetic pole of the rotor includes:
   at each of the energization angles, multiplying a value of the first current component by a cosine value of the energization angle, obtaining a total sum of multiplication results obtained for the energization angles, and thereby calculating a first integrated value;
   at each of the energization angles, multiplying the value of the first current component by a sine value of the energization angle, obtaining a total sum of multiplication results obtained for the energization angles, and thereby calculating a second integrated value; and
   calculating the phase angle based on a ratio between the first integrated value and the second integrated value.

8. The method of estimating an initial position of a magnetic pole of a rotor according to claim 7, wherein the calculating the phase angle includes calculating an inverse tangent of the ratio between the first integrated value and the second integrated value.

9. The method of estimating an initial position of a magnetic pole of a rotor according to claim 5, further comprising determining L energization angles as the energization angles, the L energization angles corresponding to angles at which one electrical cycle of the motor is divided equally into L segments, wherein
   the determining L energization angles includes:
   determining a maximum allowable amount [degree] of an angle error based on a folding distortion included in the estimated initial position of the magnetic pole; and
   determining L such that a ratio [%] of an amplitude of a (L−1)-order component with respect to an amplitude of a first-order component among Fourier series components is equal to or less than a value that is 1.67 times as large as the maximum allowable amount, the Fourier series components being obtained from a waveform of the first current component with respect to the energization angles.

10. The method of estimating an initial position of a magnetic pole of a rotor according to claim 5, further comprising:
in a state where the rotor is pulled to each of a plurality of preset calibration electrical angles by a current flowing through the stator winding, estimating the initial position of the magnetic pole of the rotor, and thereby obtaining a deviation in advance between each of the calibration electrical angles and a corresponding one of a plurality of estimated initial positions of the magnetic pole of the rotor, and
correcting a newly obtained estimated initial position of the magnetic pole of the rotor based on a relation between each of the estimated initial positions and a corresponding one of deviations obtained in advance.

11. The method of estimating an initial position of a magnetic pole of a rotor according to claim 10, wherein the correcting a newly obtained estimated initial position includes calculating a deviation corresponding to the newly obtained estimated initial position of the magnetic pole of the rotor by an interpolation process using the relation between each of the estimated initial positions and a corresponding one of the deviations obtained in advance.

12. The method of estimating an initial position of a magnetic pole of a rotor according to claim 10, wherein the correcting a newly obtained estimated initial position includes calculating a deviation corresponding to the newly obtained estimated initial position of the magnetic pole of the rotor by using a polynomial approximation curve that is based on the relation between each of the estimated initial positions and a corresponding one of the deviations obtained in advance.

13. The method of estimating an initial position of a magnetic pole of a rotor according to claim 10, wherein the obtaining a deviation in advance is performed in at least one of:
a case where a product equipped with the motor is manufactured;
a case where the product is installed at a user site; and
a case where the motor equipped in the product is replaced.

14. The method of estimating an initial position of a magnetic pole of a rotor according to claim 10, wherein
the motor is used to drive a corresponding one of a plurality of rollers in an image forming apparatus that forms an image on a sheet of paper conveyed from a paper feed cassette using the plurality of rollers,
the plurality of rollers include:
a first roller that stops in a state where the sheet of paper is held by a roller nip;
a second roller that stops in a state where the sheet of paper comes into contact with an inlet of the roller nip; and
a plurality of third rollers that do not stop in each of a state where the sheet of paper is held by the roller nip and a state where the sheet of paper comes into contact with the inlet of the roller nip, and
the correcting a newly obtained estimated initial position is performed for each of the motors for driving a corresponding one of the first roller and the second roller.

15. The method of estimating an initial position of a magnetic pole of a rotor according to claim 14, wherein the correcting a newly obtained estimated initial position is not performed for each of the motors for driving a corresponding one of the third rollers.

16. The method of estimating an initial position of a magnetic pole of a rotor according to claim 14, further comprising
determining whether the correcting a newly obtained estimated initial position is performed or not for each of the motors for driving a corresponding one of the third rollers, in accordance with at least one of:
a diameter of each of the third rollers;
a speed reduction ratio between each of the third rollers and a corresponding one of the motors that drive the respective third rollers; and
a number of pole pairs of each of the motors that drive the respective third rollers.

17. The method of estimating an initial position of a magnetic pole of a rotor according to claim 16, wherein
the correcting a newly obtained estimated initial position is performed only when a value obtained by dividing the diameter of each of the third rollers by a product of the speed reduction ratio and the number of pole pairs is equal to or greater than a reference value.

18. The method of estimating an initial position of a magnetic pole of a rotor according to claim 14, wherein the obtaining a deviation in advance is performed in a time period from when a power supply of the image forming apparatus is turned on to when the motor is started for conveying the sheet of paper.

19. An image forming apparatus comprising:
a plurality of rollers that each convey a sheet of paper from a paper feed cassette;
a printer that forms an image on the sheet of paper that is conveyed; and
a motor control device that controls a motor that drives at least one of the rollers, the motor being of a sensorless type, wherein
the motor control device includes:
a drive circuit that applies a voltage to each of a plurality of phases of a stator winding of the motor, and
a controller that controls the drive circuit,
when the controller estimates an initial magnetic pole position of a rotor of the motor in an inductive sensing scheme, the controller:
(i) causes the drive circuit to continuously or intermittently apply a voltage to the stator winding at each of a plurality of energization angles while sequentially changing the energization angles, and at a voltage value and for an energization time period, the voltage value and the energization time period being set such that the rotor does not rotate;
(ii) converts peak values of currents flowing through the phases of the stator winding into a first current component having an electrical angle that is equal to a corresponding one of the energization angles and a second current component that is different in electrical angle by 90 degrees from the first current component, each of the peak values being obtained at a corresponding one of the energization angles; and
(iii) estimates the initial magnetic pole position of the rotor based on a phase angle of a trigonometric function curve, the phase angle being obtained when a variation of the first current component with respect to each of the energization angles is approximated by the trigonometric function curve, and
the trigonometric function curve has a cycle equal to one electrical cycle of the motor.

* * * * *